(12) United States Patent
Do et al.

(10) Patent No.: US 12,422,899 B2
(45) Date of Patent: Sep. 23, 2025

(54) ELECTRONIC DEVICE INCLUDING HINGE MODULE

(71) Applicant: Samsung Electronics Co., Ltd., Suwon-si (KR)

(72) Inventors: Minhong Do, Suwon-si (KR); Yongwoon Kim, Suwon-si (KR); Eunsoo Park, Suwon-si (KR); Jaebum Bae, Suwon-si (KR); Yonglak Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 18/470,716

(22) Filed: Sep. 20, 2023

(65) Prior Publication Data

US 2024/0094784 A1     Mar. 21, 2024

Related U.S. Application Data

(63) Continuation of application No. PCT/KR2023/014240, filed on Sep. 20, 2023.

(30) Foreign Application Priority Data

Sep. 21, 2022 (KR) .......... 10-2022-0119227
Oct. 13, 2022 (KR) .......... 10-2022-0131828

(51) Int. Cl.
  *G06F 1/16*   (2006.01)
(52) U.S. Cl.
  CPC .................. *G06F 1/1681* (2013.01)

(58) Field of Classification Search
  CPC .... G06F 1/1652; G06F 1/1681; G06F 1/1616; G06F 1/1624; G06F 1/1641; E05F 1/1223
  See application file for complete search history.

(56) References Cited

U.S. PATENT DOCUMENTS

| | | | | |
|---|---|---|---|---|
| 6,125,509 A | * | 10/2000 | Hartigan | G06F 1/1681 16/337 |
| 7,373,692 B2 | * | 5/2008 | Kfoury | E05D 15/00 16/334 |
| 9,395,761 B2 | * | 7/2016 | Yukawa | G06F 1/1675 |

(Continued)

FOREIGN PATENT DOCUMENTS

| KR | 20-0338331 | 1/2004 |
|---|---|---|
| KR | 10-0419228 | 6/2006 |

(Continued)

OTHER PUBLICATIONS

International Search Report dated Dec. 22, 2023, issued in International Patent Application No. PCT/KR2023/014240.

*Primary Examiner* — Abhishek M Rathod
(74) *Attorney, Agent, or Firm* — Jefferson IP Law, LLP

(57) ABSTRACT

According to an embodiment of the disclosure, an electronic device may comprise a housing including a first housing and a second housing configured to rotate relative to the first housing and a hinge module rotatably coupling the first housing and the second housing and received in the housing. The hinge module includes a hinge housing including a receiving space, a spring positioned in the receiving space of the hinge housing, a supporting member including an inclined portion coupled to one end of the spring, and a cam coupled to another end of the spring and configured to transfer force to the spring.

19 Claims, 23 Drawing Sheets

(56) References Cited

U.S. PATENT DOCUMENTS

| | | | |
|---|---|---|---|
| 11,611,641 B2 | 3/2023 | Cha | |
| 2006/0265838 A1 | 11/2006 | Duan et al. | |
| 2010/0064478 A1 | 3/2010 | Duan et al. | |
| 2013/0081229 A1* | 4/2013 | Hirano | G06F 1/1616 |
| | | | 16/341 |
| 2013/0160243 A1* | 6/2013 | Kakizaki | G06F 1/1681 |
| | | | 16/341 |
| 2014/0376180 A1* | 12/2014 | Chen | G06F 1/1681 |
| | | | 361/679.55 |
| 2018/0314302 A1* | 11/2018 | Gopalan | H04M 1/02 |
| 2020/0263471 A1* | 8/2020 | Jo | E05F 3/20 |
| 2021/0247814 A1 | 8/2021 | Nguyen et al. | |
| 2021/0409532 A1 | 12/2021 | Lee et al. | |
| 2022/0159109 A1* | 5/2022 | Kang | G06F 1/1616 |

FOREIGN PATENT DOCUMENTS

| | | |
|---|---|---|
| KR | 10-0769850 B1 | 10/2007 |
| KR | 10-2010-0130036 A | 12/2010 |
| KR | 10-2018-0131143 A | 12/2018 |
| KR | 10-2021-0102527 A | 8/2021 |
| KR | 10-2021-0153523 A | 12/2021 |
| WO | 2022-124426 A1 | 6/2022 |

\* cited by examiner

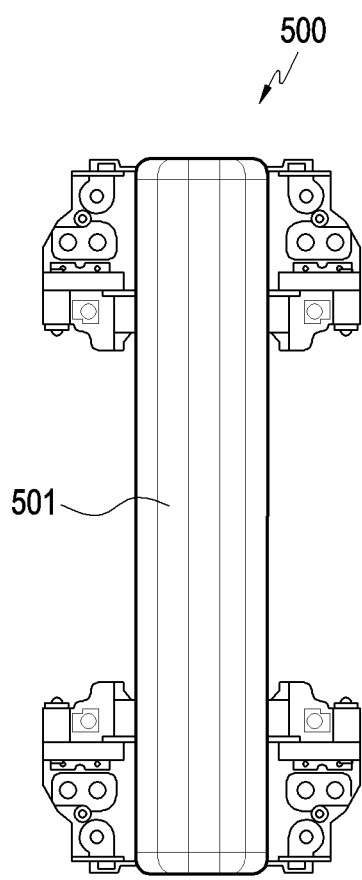
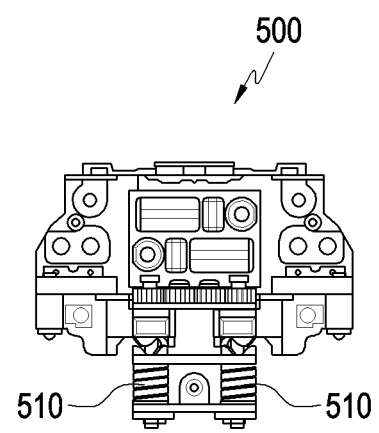
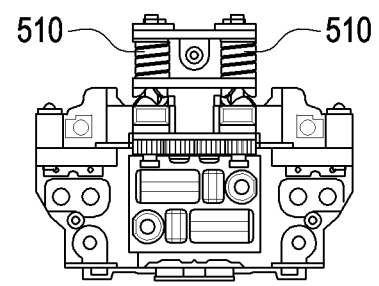
FIG. 8A                FIG. 8B

ELECTRONIC DEVICE INCLUDING HINGE MODULE

CROSS-REFERENCE TO RELATED APPLICATION(S)

This application is a continuation application, claiming priority under § 365(c), of an International application No. PCT/KR2023/014240, filed on Sep. 20, 2023, which is based on and claims the benefit of a Korean patent application number 10-2022-0119227, filed on Sep. 21, 2022, in the Korean Intellectual Property Office, and of a Korean patent application number 10-2022-0131828, filed on Oct. 13, 2022, in the Korean Intellectual Property Office, the disclosure of each of which is incorporated by reference herein in its entirety.

TECHNICAL FIELD

The disclosure relates to an electronic device including a hinge module.

BACKGROUND ART

Electronic device may refer to a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, or the like. For example, the electronic devices may output stored information as voices or images. As electronic devices are highly integrated, and high-speed or high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. These electronic devices have been downsized to be conveniently carried by users.

As mobile communication services spread up to multimedia services, users may use multimedia services as well as voice calls or text messaging, on their electronic device. To rid the user of any inconvenience in using multimedia services, a trend is to pack an electronic device with a larger display panel. Recently, flexible display panel-equipped foldable electronic devices come along.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

According to an embodiment of the disclosure, an electronic device may comprise a housing including a first housing and a second housing configured to rotate relative to the first housing and a hinge module rotatably coupling the first housing and the second housing and received in the housing. The hinge module may include a hinge housing including a receiving space, a spring positioned in the receiving space of the hinge housing, a supporting member coupled to one end of the spring and including an inclined portion corresponding to the one end of the spring, and a cam coupled to another end of the spring and transferring force to the spring.

According to an embodiment of the disclosure, an electronic device may comprise a housing including a first housing and a second housing configured to rotate relative to the first housing and a hinge module rotatably coupling the first housing and the second housing and received in the housing. The hinge module may include a hinge housing including a receiving space, a spring positioned in the receiving space of the hinge housing, a supporting member coupled to one end of the spring and including an inclined portion corresponding to the one end of the spring, and a cam coupled to another end of the spring and transferring force to the spring. The supporting member may include a flat first portion recessed by a first length, a flat second portion extending from the first portion and recessed by a second length longer than the first length, and a flat third portion extending from the second portion and recessed by a third length longer than the second length. A position where the one end of the spring is seated on the inclined portion of the supporting member may be varied depending on a degree of rotation of the supporting member.

BRIEF DESCRIPTION OF DRAWINGS

FIGS. 8A and 8B are views illustrating rear and front surfaces of a hinge module, according to an embodiment of the disclosure;

MODE FOR THE INVENTION

Figure 1:
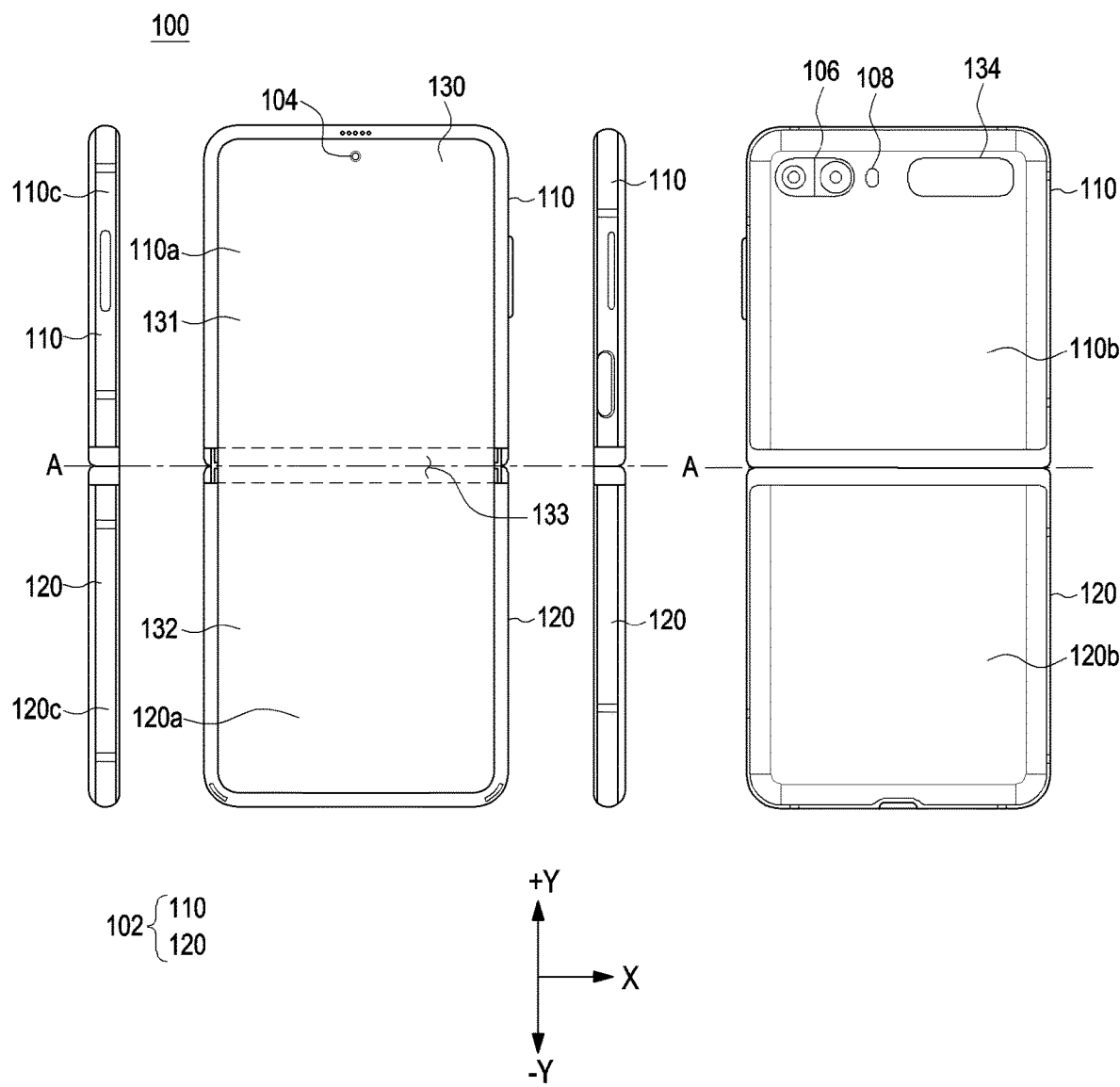
FIG. 1 is a view illustrating an unfolded state of an electronic device according to an embodiment of the disclosure.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment with regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
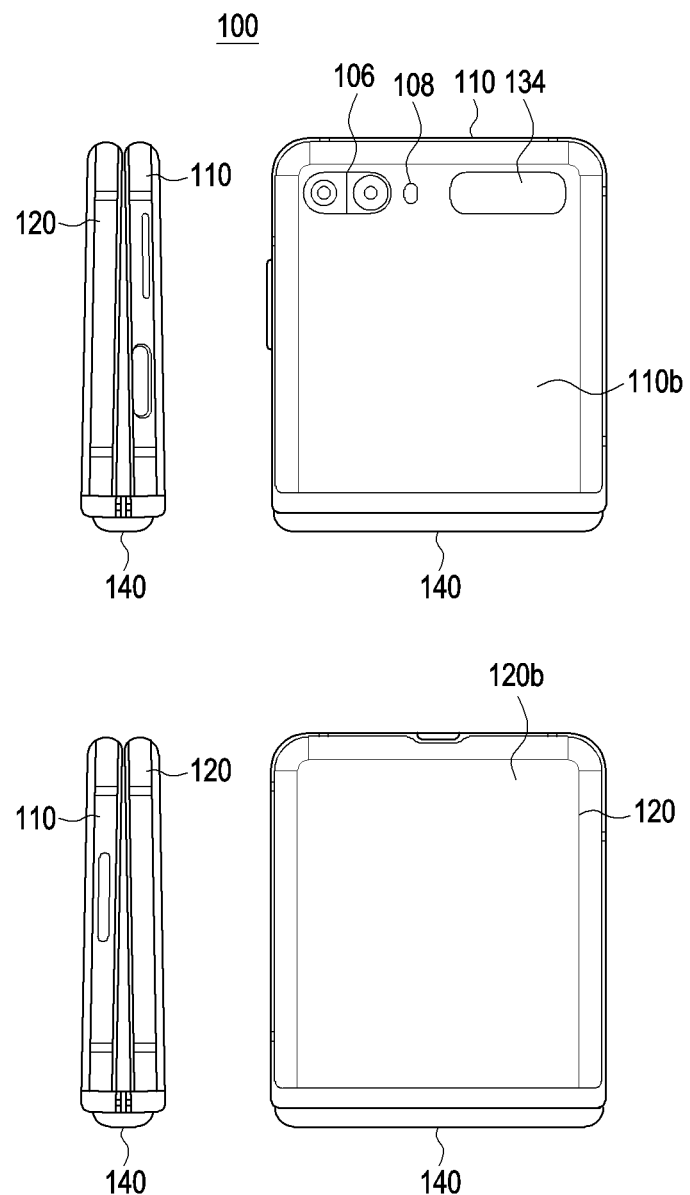
FIG. 2 is a view illustrating a folded state of an electronic device according to an embodiment of the disclosure.

FIG. 1 is a view illustrating an unfolded state of an electronic device according to an embodiment of the disclosure. FIG. 2 is a view illustrating a folded state of an electronic device according to an embodiment of the disclosure.

Referring to FIGS. 1 and 2, an electronic device 100 may include a foldable housing 102 (hereinafter, referred to as a housing 102) for receiving components (e.g., a hinge module 180 of FIG. 3) of the electronic device 100 and a flexible or foldable display 130 (hereinafter, referred to as a "display" 130) disposed in a space formed by the housing 102.

According to an embodiment, the housing 102 may include a first housing 110 and a second housing 120.

According to an embodiment, the first housing 110 and/or the second housing 120 may form a portion of the exterior of the electronic device 100. According to an embodiment, the surface where the display 130 is visually exposed is defined as a front surface (e.g., a first front surface 110a and a second front surface 120a) of the electronic device 100 and/or housing 102. A surface opposite to the front surface is defined as a rear surface (e.g., a first rear surface 110b and a second rear surface 120b) of the electronic device 100. Further, a surface surrounding at least a portion of the space between the front surface and the rear surface is defined as a side surface (e.g., the first side surface 110c and the second side surface 120c) of the electronic device 100.

Figure 3:
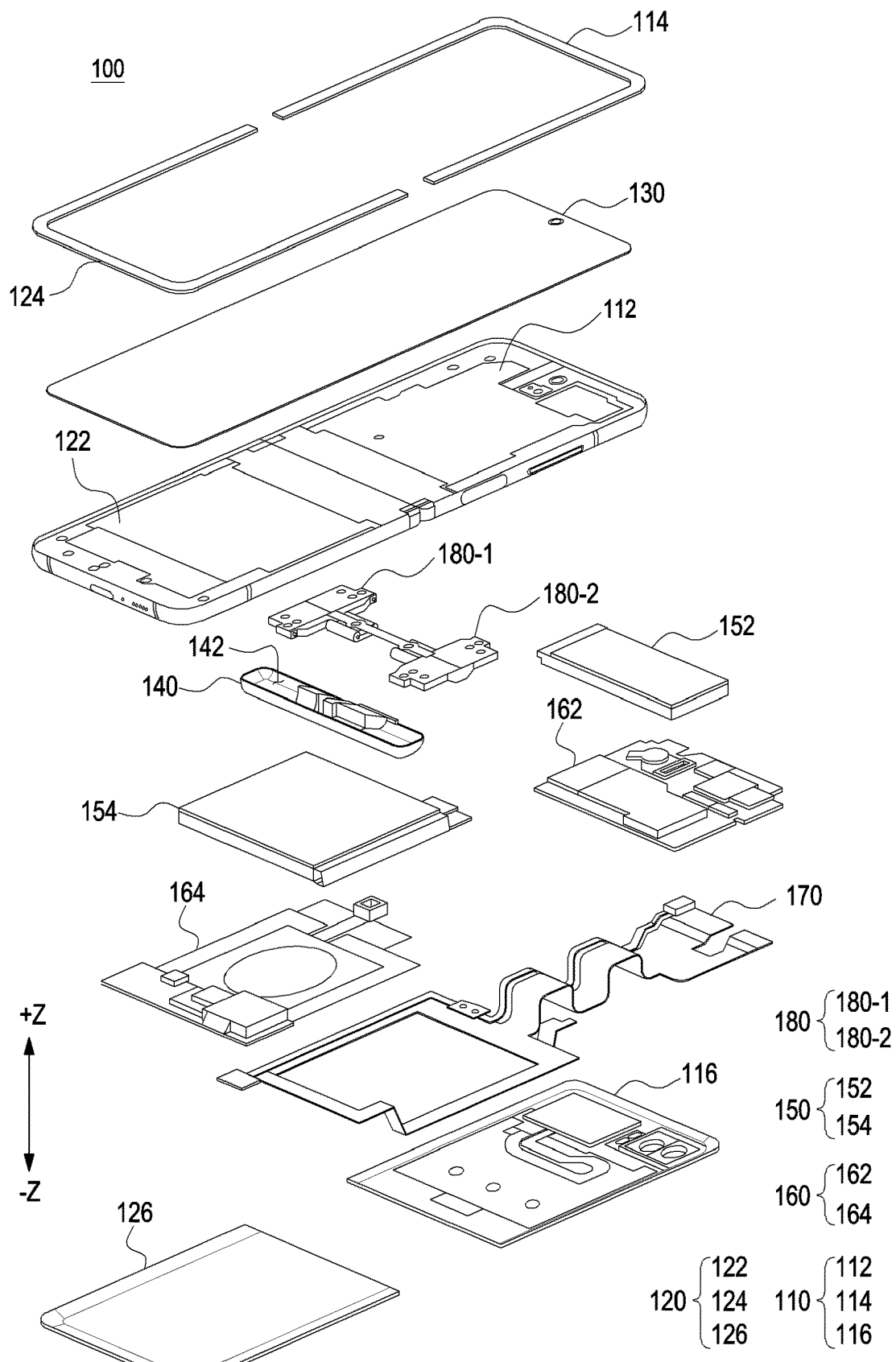
FIG. 3 is a perspective view illustrating an electronic device according to an embodiment of the disclosure.

According to an embodiment, the first housing 110 may be rotatably connected to the second housing 120 by a hinge module (e.g., the hinge module 180 of FIG. 3). For example, the first housing 110 and the second housing 120 may be connected to each other to be rotatable about the hinge module 180. Thus, the electronic device 100 may turn into a folded state (e.g., FIG. 2) or unfolded state (e.g., FIG. 1). In the folded state of the electronic device 100, the first front surface 110a may face the second front surface 120a and, in the unfolded state, the direction in which the first front surface 110a faces may be the same as the direction in which the second front surface 120a faces. For example, in the unfolded state, the first front surface 110a may be positioned on substantially the same plane as the second front surface 120a. According to an embodiment, the second housing 120 may provide a motion relative to the first housing 110.

According to an embodiment, the first housing 110 and the second housing 120 are disposed on both sides of the folding axis A and be overall symmetrical in shape with respect to the folding axis A. As described below, the angle between the first housing 110 and the second housing 120 may be changed depending on whether the electronic device 100 is in the unfolded state, the folded state, or an intermediate state between the unfolded state and the folded state. According to an embodiment, the folding axis A may be a virtual axis positioned between (e.g., in the middle) between a first rotational axis (e.g., the first rotational axis Ax1 of FIG. 4) and a second rotational axis (e.g., the second rotational axis Ax2 of FIG. 4).

According to an embodiment, the electronic device 100 may include a hinge housing 140. The hinge housing 140 may be disposed between the first housing 110 and the second housing 120. According to an embodiment, the hinge housing 140 may be hidden by a portion of the first housing 110 and second housing 120 or be exposed to the outside depending on the state of the electronic device 100. According to an embodiment, the hinge housing 140 may protect the hinge module (e.g., the hinge module 180 of FIG. 3) from an external impact of the electronic device 100. According to an embodiment, the hinge housing 140 may be interpreted as a hinge cover for protecting the hinge module 180.

According to an embodiment, as shown in FIG. 1, in the unfolded state of the electronic device 100, the hinge housing 140 may be hidden, and thus not exposed, by the first housing 110 and the second housing 120. As another example, as shown in FIG. 2, in the folded state (e.g., a fully folded state) of the electronic device 100, the hinge housing 140 may be exposed to the outside between the first housing 110 and the second housing 120. As another example, in an intermediate state in which the first housing 110 and the second housing 120 are folded with a certain angle, the hinge housing 140 may be partially exposed to the outside between the first housing 110 and the second housing 120. However, in this case, the exposed area may be smaller than that in the completely folded state. In an embodiment, the hinge housing 140 may include a curved surface.

According to various embodiments, the display 130 may mean a display at least a portion of which may be transformed into a flat or curved surface. For example, the display 130 may be formed to be transformable in response to the motion of the second housing 120 relative to the first housing 110. According to an embodiment, the display 130 may include a folding area 133, a first display area 131 disposed on one side of the folding area 133 (e.g., above the folding area 133 (in the +Y direction) of FIG. 1), and a second display area 132 disposed on the other side of the folding area 203 (e.g., under the folding area 133 (in the −Y direction) of FIG. 1). According to an embodiment, the folding area 133 may be formed over the hinge module (e.g., the hinge module 180 of FIG. 3). According to an embodiment, the first display area 131 may be disposed on the first housing 110, and the second display area 132 may be disposed on the second housing 120. According to an embodiment, the display 130 may be received in the first housing 110 and the second housing 120.

However, the segmentation of the display 130 as shown in FIG. 1 is merely an example, and the display 130 may be divided into a plurality of (e.g., four or more, or two) areas depending on the structure or function of the display 200. For example, in the embodiment illustrated in FIG. 1, the display 130 may be divided into the areas by the folding area 133 or folding axis (axis A) extending in parallel with the X axis but, in another embodiment, the display 130 may be divided into the areas with respect to another folding area (e.g., a folding area parallel with the X axis) or another folding axis (e.g., a folding axis parallel with the X axis). According to an embodiment, the display 130 may be coupled with or disposed adjacent to a touch detection circuit, a pressure sensor capable of measuring the strength (pressure) of touches, and/or a digitizer for detecting a magnetic field-type stylus pen.

According to an embodiment, the electronic device 100 may include a rear display 134. The rear display 134 may be disposed to face in a different direction from the display 130. For example, the display 130 may be visually exposed through the front surface (e.g., the first front surface 110a and/or the second front surface 120a) of the electronic device 100, and the rear display 134 may be visually exposed through the rear surface (e.g., the first rear surface 110b) of the electronic device 100.

According to an embodiments, the electronic device 100 may include at least one camera 104 and 106 and a flash 108. According to an embodiment, the electronic device 100 may include a front camera 104 exposed through the front surface (e.g., the first front surface 110a) and/or a rear camera 106 exposed through the rear surface (e.g., the first rear surface 120b). The cameras 104 and 106 may include one or more lenses, an image sensor, a flash, and/or an image signal processor. The flash 108 may include, e.g., a light emitting diode (LED) or a xenon lamp. In an embodiment, two or more lenses (an infrared (IR) camera, a wide-angle lens, and a telephoto lens) and image sensors may be disposed on one surface of the electronic device 100.

Figure 4:
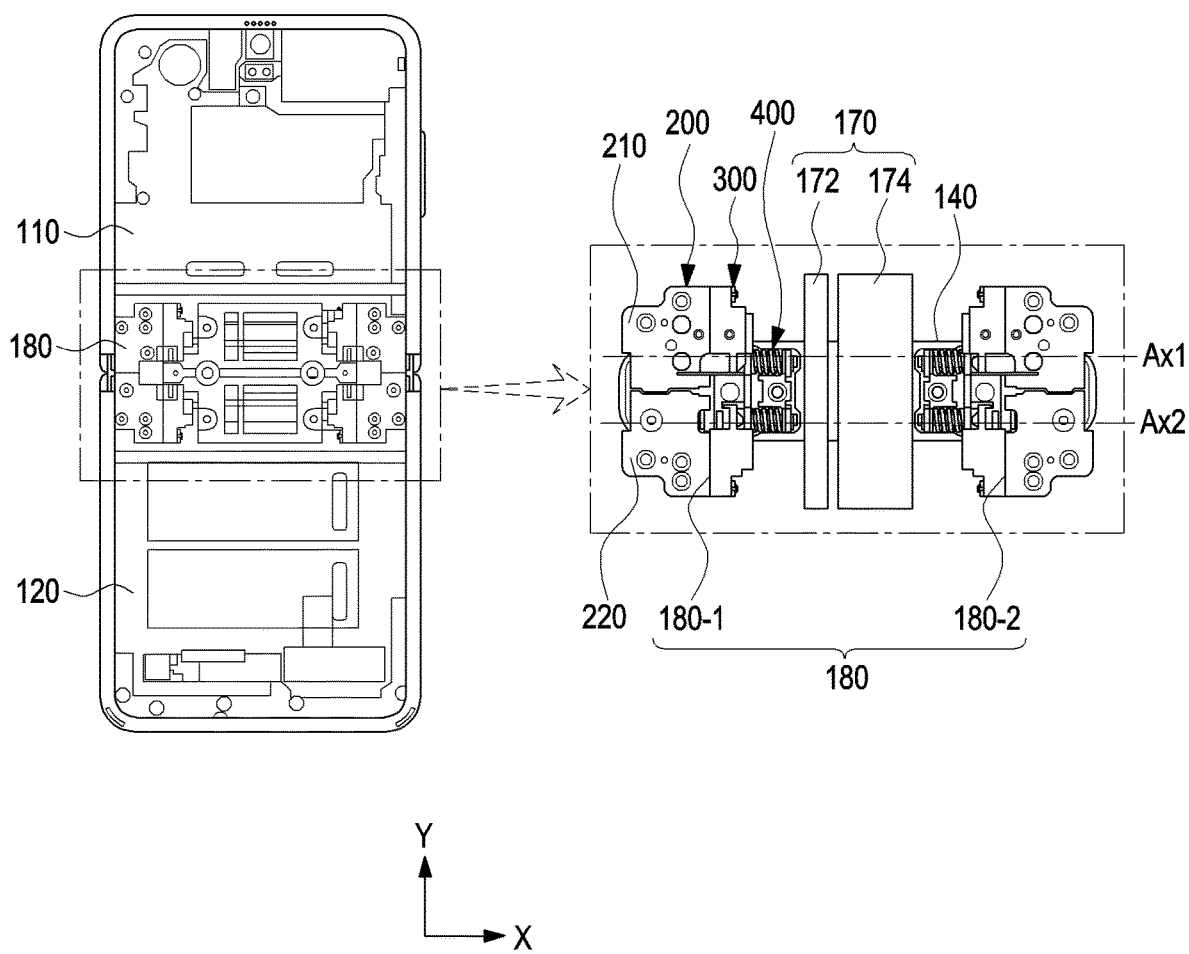
FIG. 4 is a front view illustrating an electronic device except for a display according to an embodiment of the disclosure.

FIG. 3 is a perspective view illustrating an electronic device according to an embodiment of the disclosure. FIG. 4 is a front view illustrating an electronic device except for a display according to an embodiment of the disclosure.

Referring to FIGS. 3 and 4, an electronic device 100 may include a first housing 110, a second housing 120, a display 130, a hinge housing 140, a battery 150, a printed circuit board 160, a flexible printed circuit board 170, and a hinge module 180. The configuration of the first housing 110, the second housing 120, the display 130, and the hinge housing 140 of FIGS. 3 and 4 may be identical in whole or part to the configuration of the first housing 110, the second housing 120, the display 130, and the hinge housing 140 of FIGS. 1 and 2.

According to an embodiment, the housing 110 and 120 may include a first supporting member 112 or a second supporting member 122. For example, the first housing 110 may include a first supporting member 112, and the second housing 120 may include a second supporting member 122. According to an embodiment, the first supporting member 112 and/or the second supporting member 122 may support components (e.g., the display 130, the battery 150, and the printed circuit board 160) of the electronic device 100.

According to an embodiment, the first supporting member 112 and/or the second supporting member 122 may be formed of a metal material and/or a non-metal (e.g., polymer) material. According to an embodiment, the first supporting member 112 may be disposed between the display 130 and the battery 150. For example, the display 130 may be coupled to one surface of the first supporting member 112, and the battery 150 and the printed circuit board 160 may be disposed on the other surface.

According to an embodiment, the housing 110 and 120 may include a first deco member 114 and a second deco member 124. For example, the first housing 110 may include the first deco member 114, and the second housing 120 may include the second deco member 124. According to an embodiment, the deco members 114 and 124 may protect the display 130 from external impact. For example, the first deco member 114 may surround at least a portion of a portion (e.g., the first display area 131 of FIG. 1) of the display 130, and the second deco member 124 may surround at least a portion of another portion (e.g., the second display area 132 of FIG. 1) of the display 130.

According to an embodiment, the housings 110 and 120 may include a first rear plate 116 and a second rear plate 126. For example, the first housing 110 may include a first rear plate 116 connected to the first supporting member 112, and the second housing 120 may include a second rear plate 126 connected to the second supporting member 122. According to an embodiment, the rear plates 116 and 126 may form at least a portion of the exterior of the electronic device 100. For example, the first rear plate 116 may form a first rear surface (e.g., the first rear surface 110b of FIG. 1), and the second rear plate 126 may form a second rear surface (e.g., the second rear surface 120b of FIG. 1). According to an embodiment, the first battery 152 and the first printed circuit board 162 may be disposed between the first supporting member 112 and the first rear plate 116. The second battery 154 and the second printed circuit board 164 may be disposed between the second supporting member 122 and the second rear plate 126.

According to an embodiment, the hinge housing 140 may receive at least a portion of the hinge module 180. For example, the hinge housing 140 may include a receiving recess 142 for receiving the hinge module 180. According to an embodiment, the hinge housing 140 may be coupled to the hinge module 180. According to an embodiment, in the unfolded state of the electronic device 100, at least a portion of the hinge housing 140 may be positioned between the hinge module 180 and the housing 110 and 120.

According to an embodiment, the battery 150 may be a device for supplying power to at least one component of the electronic device 100. The battery 189 may include a primary cell which is not rechargeable, a secondary cell which is rechargeable, or a fuel cell. The battery 150 may be integrally or detachably disposed inside the electronic device 100. According to an embodiment, the battery 150 may include a first battery 152 disposed in the first housing 110 and a second battery 154 disposed in the second housing 120. For example, the first battery 152 may be disposed on the first supporting member 112. The second battery 154 may be disposed on the second supporting member 122.

According to an embodiment, a processor, a memory, and/or an interface may be mounted on the printed circuit board 160. The processor may include one or more of, e.g., a central processing unit, an application processor, a graphic processing device, an image signal processing, a sensor hub processor, or a communication processor. The memory may include a volatile or non-volatile memory. The interface may include, e.g., a high definition multimedia interface (HDMI), a universal serial bus (USB) interface, a secure digital (SD) card interface, and/or an audio interface. The interface may electrically or physically connect, e.g., the electronic device 100 with an external electronic device and may include a USB connector, an SD card/multimedia card (MMC) connector, or an audio connector. According to an embodiment, the printed circuit board 160 may include a first printed circuit board 162 disposed in the first housing 110 and a second printed circuit board 164 disposed in the second housing 120.

According to an embodiment, the flexible printed circuit board 170 may electrically connect a component (e.g., first printed circuit board 162) positioned in the first housing 110 with a component (e.g., second printed circuit board 164) positioned in the second housing 120. According to an embodiment, the flexible printed circuit board 170 may cross the hinge housing 140. For example, a portion of the flexible printed circuit board 170 may be disposed in the first housing 110, and another portion thereof may be disposed in the second housing 120. According to an embodiment, the flexible printed circuit board 170 may include a first flexible printed circuit board 172 connected to an antenna and a second flexible printed circuit board 174 connected to the display 130.

According to an embodiment, the hinge module 180 may be connected to the first housing 110 and the second housing 120. For example, the hinge module 180 may include a first rotating member 210 connected to or coupled to the first support member 112 of the first housing 110 and a second rotating member 220 connected to or coupled to the second support member 122 of the second housing 120. According to an embodiment, the first housing 110 may rotate about the second housing 120 by the hinge module 180. For example, the first housing 110 and/or the first rotating member 210 may rotate about the first rotational axis Ax1, and the second housing 120 and/or the second rotating member 220 may rotate about the second rotational axis Ax2. According to an embodiment, the hinge module 180 may rotatably connect the first housing 110 and the second housing 120 from a folded state (e.g., FIG. 2) to an unfolded state (e.g., FIG. 1). According to an embodiment, the hinge module 180 may be disposed between the housing 102 and the display 130. According to an embodiment, the second rotational axis Ax2 may be disposed substantially parallel to the first rotational axis Ax1.

According to an embodiment, the hinge module 180 may include a rotating structure 200, an interworking structure 300 and/or a fixing structure 400.

According to an embodiment, the rotating structure 200 may substantially implement or guide rotation of the first housing 110 and/or the second housing 120. According to an embodiment, the rotating structure 200 may provide a first rotational axis Ax1 and a second rotational axis Ax2. According to an embodiment, the rotating structure 200 may be connected to the first supporting member 112 of the first housing 110 and the second supporting member 122 of the second housing 120.

According to an embodiment, the interlocking structure 300 may interlock the rotation of the first housing 110 with the rotation of the second housing 120. According to an embodiment, the interlocking structure 300 may transfer at least a portion of the force applied to the first housing 110 to the second housing 120 or transfer at least a portion of the force applied to the second housing 120 to the first housing 110. For example, the interlocking structure 300 may rotate the second housing 120 by substantially the same angle as the angle at which the first housing 110 is rotated, using a gear member (not shown).

According to an embodiment, the fixing structure 400 may position the first housing 110 and the second housing 120 at a certain angle. For example, the fixing structure 400 may provide pressure to the interworking structure 300 to prevent or reduce movement and/or rotation of the first housing 110 and/or the second housing 120 of the electronic device 100. For example, when the user applies a predetermined degree of or more external force, the hinge module 180 may allow the first housing 110 and/or the second housing 120 to rotate, and if no or less than the predetermined degree of external force is applied, the hinge module 180 may keep the first housing 110 and/or the second housing 120 stationary using a fixing portion 400.

According to an embodiment, the hinge module 180 may include a plurality of hinge modules 180-1 and 180-2 disposed in parallel. For example, the hinge modules 180 may include a first hinge module 180-1 disposed on the hinge housing 140 and a second hinge module 180-2 facing the first hinge module 180-2. According to an embodiment, the first hinge module 180-1 may be symmetrical with the second hinge module 180-2 with respect to the length direction (e.g., the Y-axis direction) of the electronic device 100.

Figure 5:
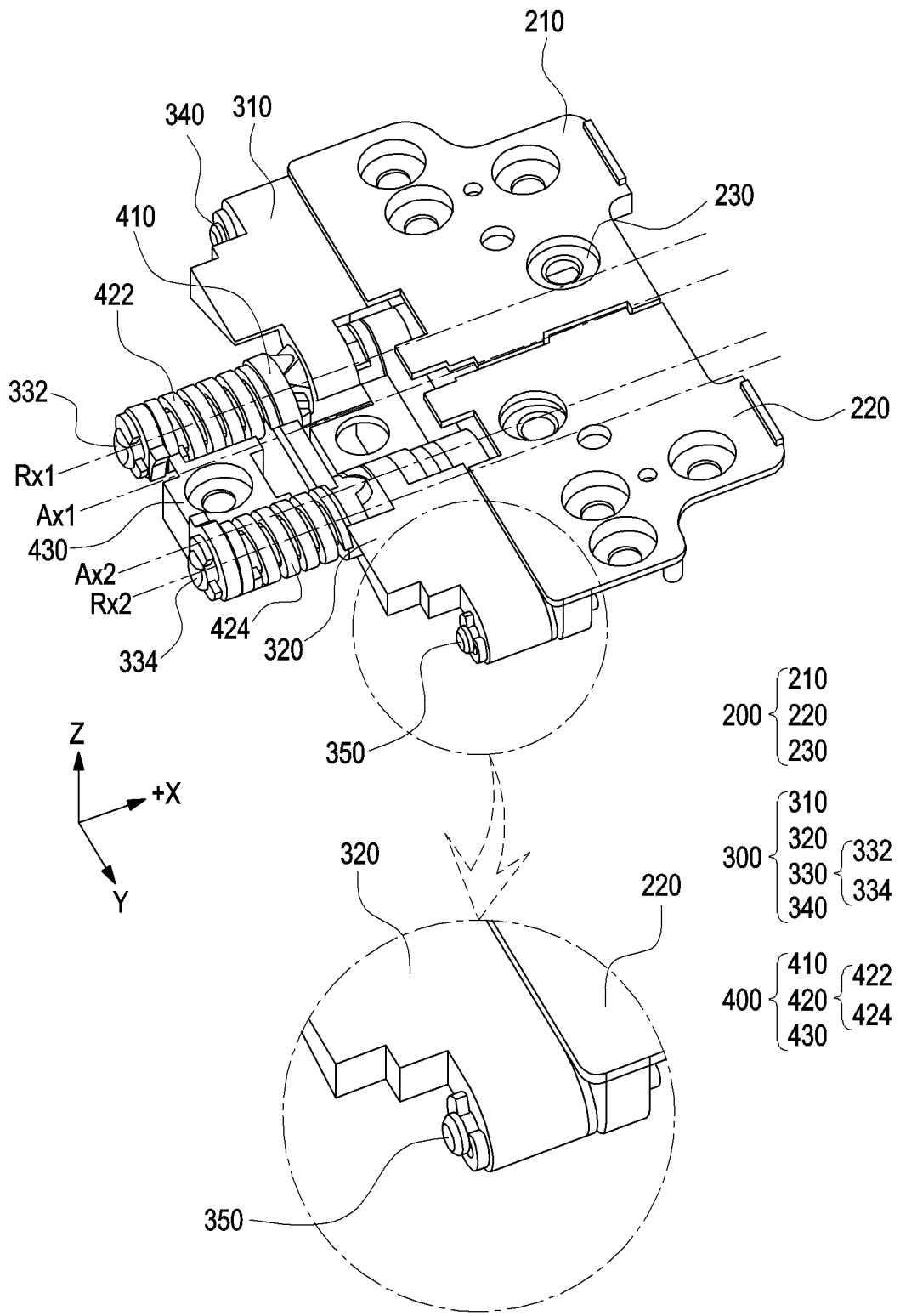
FIG. 5 is a perspective view illustrating a hinge module according to an embodiment of the disclosure.
Figure 6:
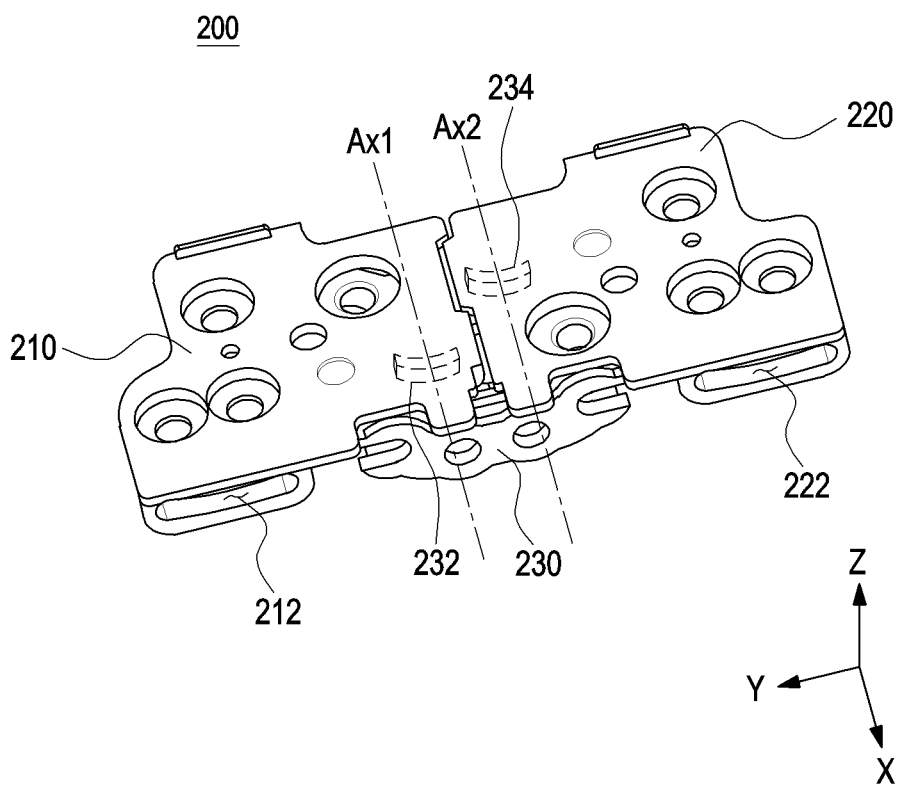
FIG. 6 is a perspective view illustrating a rotating structure according to an embodiment of the disclosure.
Figure 7:
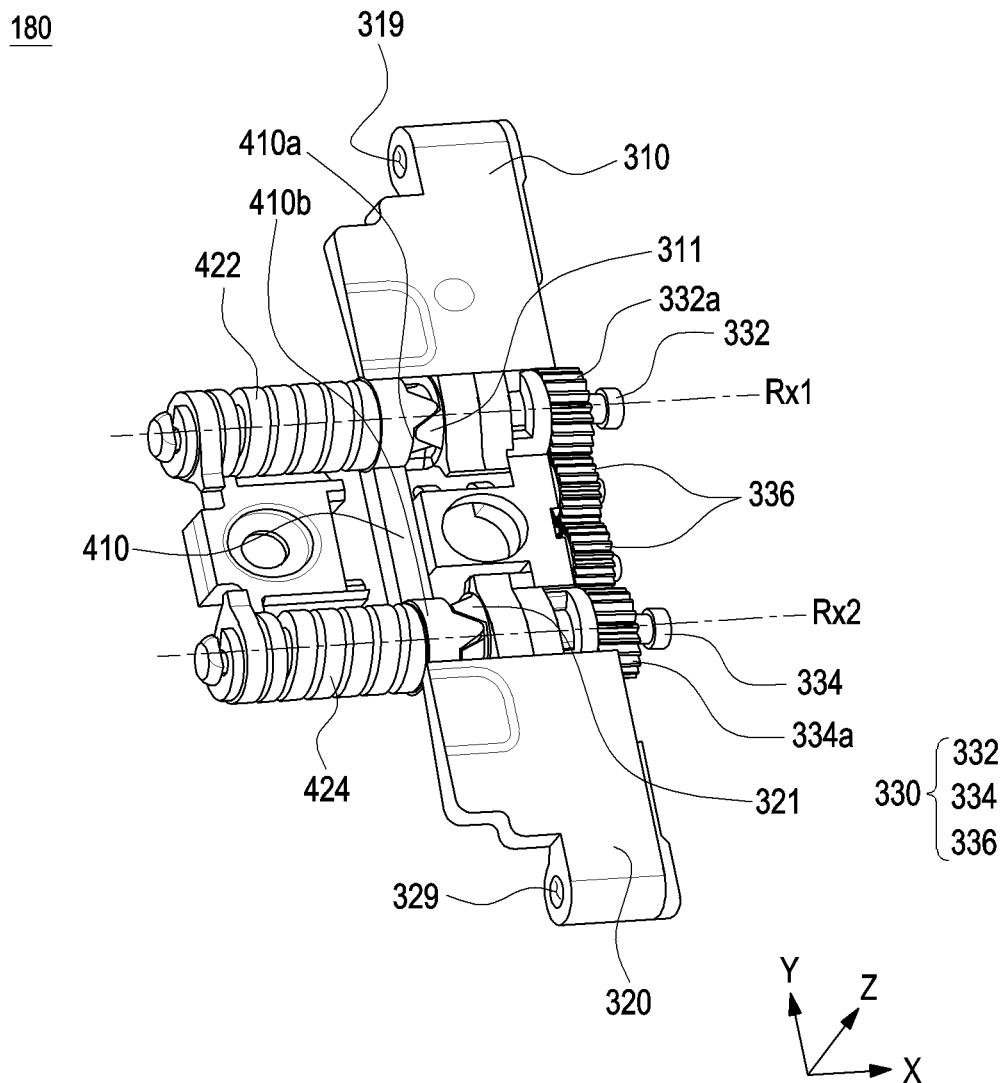
FIG. 7 is a perspective view illustrating a hinge module including an interlocking structure and a fixing structure, according to an embodiment of the disclosure.

FIG. 5 is a perspective view illustrating a hinge module 180 according to an embodiment of the disclosure. FIG. 6 is a perspective view illustrating a rotating structure 200 according to an embodiment of the disclosure. FIG. 7 is a perspective view illustrating a hinge module 180 including an interlocking structure 300 and a fixing structure 400, according to an embodiment of the disclosure.

Referring to FIGS. 5, 6, and 7, the hinge module 180 may include the rotating structure 200, the interworking structure 300, and/or the fixing structure 400. The configuration of the hinge module 180 of FIGS. 5, 6, and 7 may be identical in whole or part to the configuration of the hinge module 180 of FIG. 4.

According to an embodiment, the rotating structure 200 may include a first rotating member 210, a second rotating member 220 and a rotating bracket 230. According to an embodiment, the first rotating member 210 may be connected to the first housing (e.g., the first housing 110 of FIG. 4). The second rotating member 220 may be connected to the second housing (e.g., the second housing 120 of FIG. 4).

According to an embodiment, the rotating bracket 230 may receive the first rotating member 210 and the second rotating member 220. For example, the rotating bracket 230 may include a first rotation recess 232 formed around the first rotational axis Ax1 and a second rotation recess 234 formed around the second rotational axis Ax2. According to an embodiment, the first rotating member 210 may be received in the first rotation recess 232 and rotate about the first rotational axis Ax1. The second rotating member 220 may be received in the second rotation recess 234 and rotate about the second rotational axis Ax2.

According to an embodiment, the rotating members 210 and 220 may include pin holes 212 and 222 for receiving the pin members 340 and 350. For example, the first rotating member 210 may include a first pin hole 212 where the first pin member 340 is positioned. The second rotating member 220 may include a second pin hole 222 where the second pin member 350 is positioned. According to an embodiment, the pin holes 212 and 222 may be holes extending in the length direction (e.g., the Y-axis direction) of the electronic device 100.

According to an embodiment, the interlocking structure 300 may include a first arm member 310, a second arm member 320, a gear member 330, the first pin member 340, and the second pin member 350.

According to an embodiment, the gear member 330 may include a first gear shaft 332 rotatable about a first interlocking axis Rx1 and a second gear shaft 334 rotatable about a second interlocking axis R2. According to an embodiment, the gear of the first gear shaft 332 (e.g., a first gear 332a of FIG. 7) and the gear of the second gear shaft 334 (e.g., the second gear 334a of FIG. 7) may be engaged with each other to interlock the first housing (e.g., the first housing 110 in FIG. 1) and the second housing (e.g., the second housing 120 in FIG. 1). For example, the force delivered from the first rotating member 210 coupled to the first housing 110 may be transferred to the first gear shaft 332 through a first arm member 310. The first gear shaft 332 may be meshed with the second gear shaft 334, and the second gear shaft 334 may rotate in a direction different from that of the first gear shaft 332. The force delivered to the second gear shaft 334 may be transferred to the second arm member 320 and/or the second housing 120. According to an embodiment, the interlocking structure 300 may include a gear cover (not shown) for protecting the first gear shaft 332 and/or the second gear shaft 334 from external impact. The gear cover (not shown) may surround at least a portion of the first gear 332a and/or the second gear 332b.

According to an embodiment, the arm members 310 and 320 may be connected to the pin members 340 and 350. According to an embodiment, the first arm member 310 may be coupled to the first pin member 340 and the second arm member 320 may be coupled to the second pin member 350. According to an embodiment, the first arm member 310, together with the first gear shaft 332, may rotate about the first interlocking axis Rx1, and the second arm member 320, together with the second gear shaft 334, may rotate around the second interlocking axis Rx2. According to an embodiment, the arm members 310 and 320 may be connected to the rotating members 210 and 220 by the pin members 340 and 350. For example, the first pin member 340 connected to the first arm member 310 may be received in the first pin hole 212 of the first rotating member 210, and the second pin member 350 connected to the second arm member 320 may be received in the second pin hole 222 of the second rotating member 220. The rotational axes Ax1 and Ax2 and the interlocking axes Rx1 and Rx2 of the gear shafts 332 and 334 may be different from each other. For example, the first rotational axis, the second rotational axis Ax2, the first interlocking axis Rx1, and the second interlocking axis Rx2 may be substantially parallel to each other.

According to an embodiment, the arm members 310 and 320 may slide relative to the rotating members 210 and 220. According to an embodiment, the first pin member 340 connected to the first arm member 310 may slide in the length direction (e.g., the Y-axis direction) within the first pin hole 212. For example, in the open state (e.g., FIG. 7) of the electronic device (e.g., the electronic device 100 of FIG. 1), the first pin member 340 may make contact with the first sidewall 212-1 of the first arm member 310 facing the upper direction (the first direction) (e.g., the +Y direction) of the electronic device 100, and in the closed state (e.g., FIG. 7) of the electronic device 100, the first pin member 340 may make contact with the second sidewall 212-2 of the first arm member 310 facing the lower direction (the second direction) (e.g., the −Y direction) of the electronic device 100. According to an embodiment, as the arm members 310 and 320 slide, damage to the display (e.g., the display 130 of FIG. 3) due to the interlocking axes Rx1 and Rx2 different from the rotational axes Ax1 and Ax2 may be prevented or reduced. For example, a relative length change of the electronic device 100 may occur based on the length of the electronic device (e.g., the electronic device 100 of FIG. 1) in the thickness direction (e.g., the +Z direction). According to an embodiment, the radius of curvature of the rotating members 210 and 220 rotating about the rotational axes Ax1 and Ax2 may be different from the radius of curvature of the arm members 310 and 320 rotating about the interlocking axes Rx1 and Rx2. As the arm members 310 and 320 slide relative to the rotating members 210 and 220 using the pin members 340 and 350, damage to the display 130 received in the housing (e.g., the housing 102 of FIG. 1) connected to the rotating members 210 and 220 may be prevented or reduced. In the electronic device 100 in the folded state (e.g., FIG. 2), the display 130 may include a neutral surface having no length change in the folded state, an upper area (e.g., +Z direction) of the display 130 with respect to the neutral surface may be provided with a compressive force, and a lower area (e.g., -Z direction) of the display 130 may be provided with a stretching force or an expanding force. According to an embodiment, the rotational axes Ax1 and Ax2 may substantially form a portion of the neutral surface of the display 130, and the interlocking axes Rx1 and Rx2 may be positioned outside the neutral surface.

According to an embodiment, the fixing structure 400 may include a third cam structure 410, an elastic member 420, and a fixing bracket 430. The fixing structure 400 may provide pressure or elastic force to the first arm member 310 and the second arm member 320. According to an embodiment, the third cam structure 410 may face the first cam structure (e.g., a first cam structure 311 of FIG. 7) of the first arm member 310 and/or the second cam structure (e.g., a second cam structure 321 of FIG. 7) of the second arm member 320. According to an embodiment, the elastic member 420 may provide an elastic force to the third cam structure 410 in the third direction (e.g., the +X direction), and the third cam structure 410 may contact the first cam structure 311 and/or the second cam structure 321. According to an embodiment, the fixing bracket 430 may connect the hinge module 180 to a hinge housing (e.g., the hinge housing 140 of FIG. 4). For example, the fixing bracket 430 may be coupled to the hinge housing 140, and the elastic member 420 may be connected to the fixing bracket 430.

According to an embodiment, the arm members 310 and 320 may include cam structures 311 and 321. For example, the first arm member 310 may include a first cam structure 311, and the second arm member 320 may include a second cam structure 321. According to an embodiment, the first cam structure 311 may surround the first gear shaft 332, and the second cam structure 321 may surround the second gear shaft 334. For example, the first cam structure 311 may be mounted or fixed while surrounding the outer circumferential surface of the first gear shaft 332. As the first cam structure 311 rotates together with the first gear shaft 332, the first arm member 310 may substantially rotate about the rotational axis (e.g., the first interlocking axis Rx1) of the first gear shaft 332. According to an embodiment, the first cam structure 311 may be integrally formed with the first arm member 310. For example, the second cam structure 321 may be mounted or fixed while surrounding the outer circumferential surface of the second gear shaft 334. As the second cam structure 321 rotates together with the second gear shaft 334, the second arm member 320 may substantially rotate about the rotational axis (e.g., the second interlocking axis Rx2) of the second gear shaft 334. According to an embodiment, the second cam structure 321 may be integrally formed with the second arm member 320.

According to an embodiment, the arm members 310 and 320 may include receiving recesses 319 and 329 for receiving recess pin members (e.g., the pin members 340 and 350 of FIG. 5). For example, the first arm member 310 may include a first receiving recess 319 in which the first pin member 340 is disposed, and the second arm member 320 may include a second receiving recess 329 in which the second pin member 350 is disposed. The receiving recesses 319 and 329 may have a groove shape or a hole shape.

According to an embodiment, the hinge module 180 may include a gear member 330 including a plurality of idle gears 336 disposed between the first gear shaft 332 and the second gear shaft 334. The plurality (e.g., two) idle gears 336 may be connected to the first gear 332a of the first gear shaft 332 and the second gear 332b of the second gear shaft 332. According to an embodiment, the rotation of the first gear shaft 332 may be transferred to the second gear shaft 334 through the plurality of idle gears 336, and the rotation of the second gear shaft 334 may be transferred to the first gear shaft 332 through the plurality of idle gears 336.

According to an embodiment, the third cam structure 410 may provide pressure or frictional force to the first cam structure 311 and/or the second cam structure 321. For example, the third cam structure 410 may contact the first cam structure 311 of the first arm member 310 and/or the second cam structure 321 of the second arm member 320 to prevent or reduce the rotational movement of the first arm member 310 and/or the second arm member 320, or may rotate the first arm member 310 and/or the second arm member 320 in a designated direction.

According to an embodiment, the third cam structure 410 may include a 3-$1^{st}$ cam structure 410a facing the first cam structure 311 and a 3-$2^{nd}$ cam structure 410b facing the second cam structure 321. The 3-$1^{st}$ cam structure 410a may surround the first gear shaft 332, and the 3-$2^{nd}$ cam structure 410b may surround the second gear shaft 334. According to an embodiment, the 3-$1^{st}$ cam structure 410a may be disposed between a first elastic member 422 and the first cam structure 311, and the 3-$2^{nd}$ cam structure 410b may be disposed between a second elastic member 424 and the second cam structure 321.

Figure 9A:
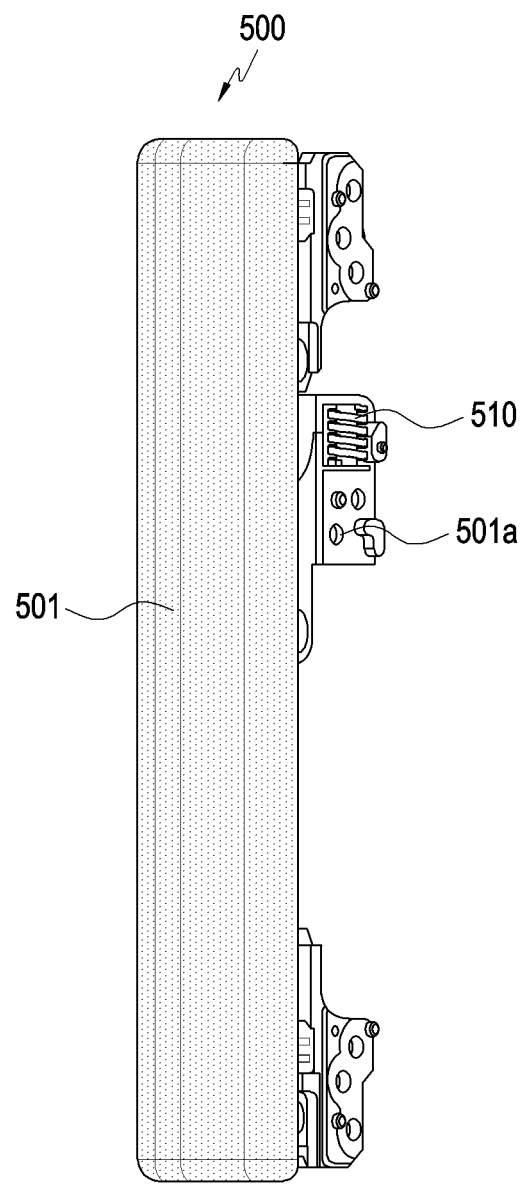
FIGS. 9A and 9B are a perspective view and a front view illustrating a rear side of a hinge module including a free-stop assembly, according to an embodiment of the disclosure.
Figure 9B:
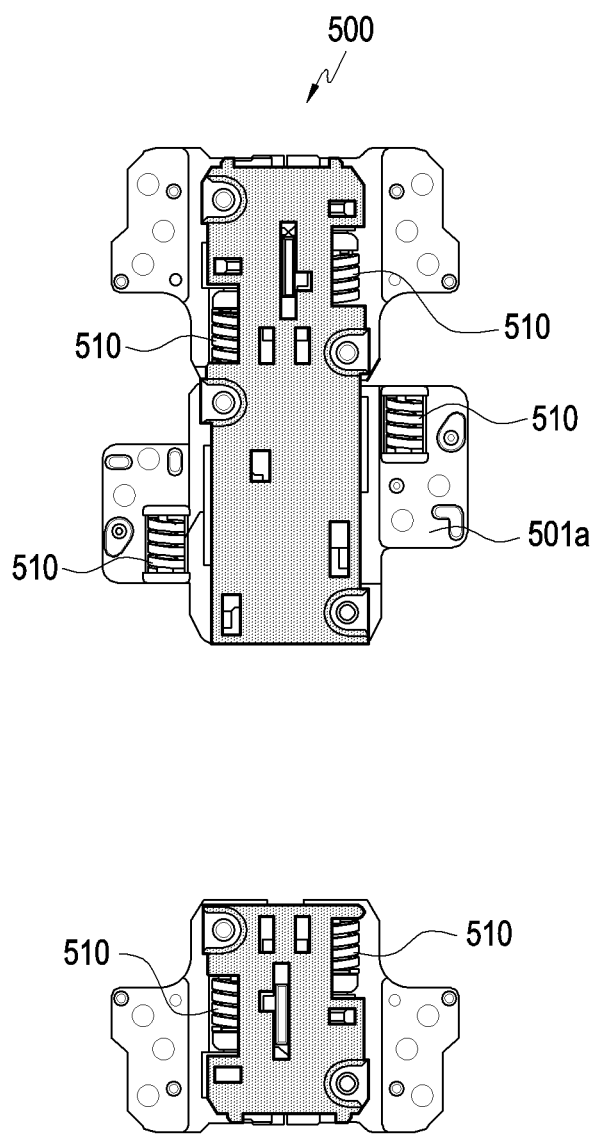
Figure 10:
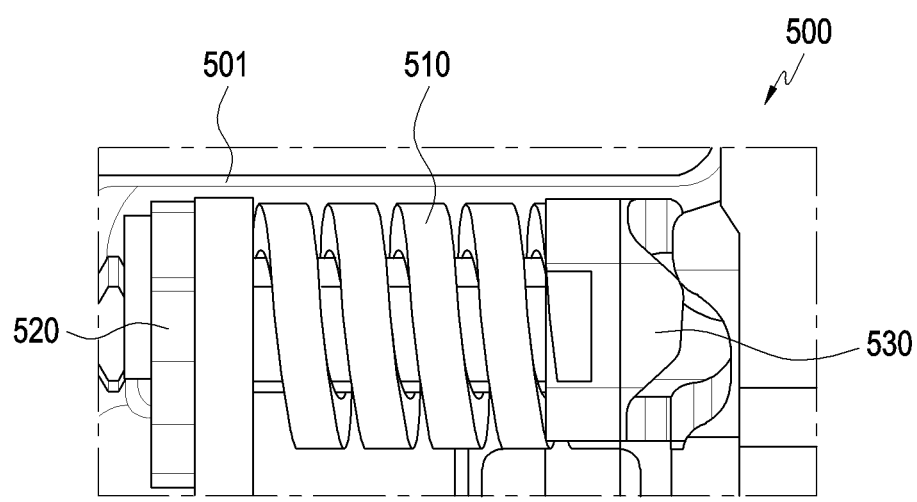
FIG. 10 is a view illustrating a portion of a hinge module according to an embodiment of the disclosure.
Figure 11:
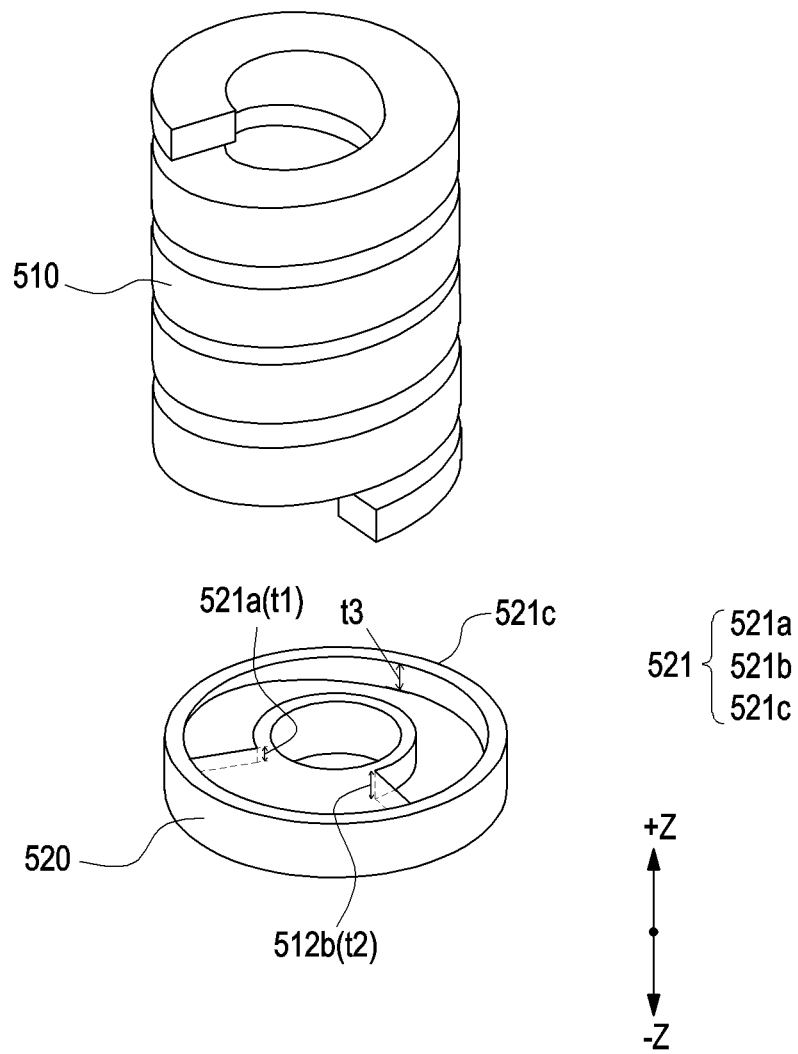
FIG. 11 is a view illustrating a spring and a supporting member according to an embodiment of the disclosure.
Figure 12:
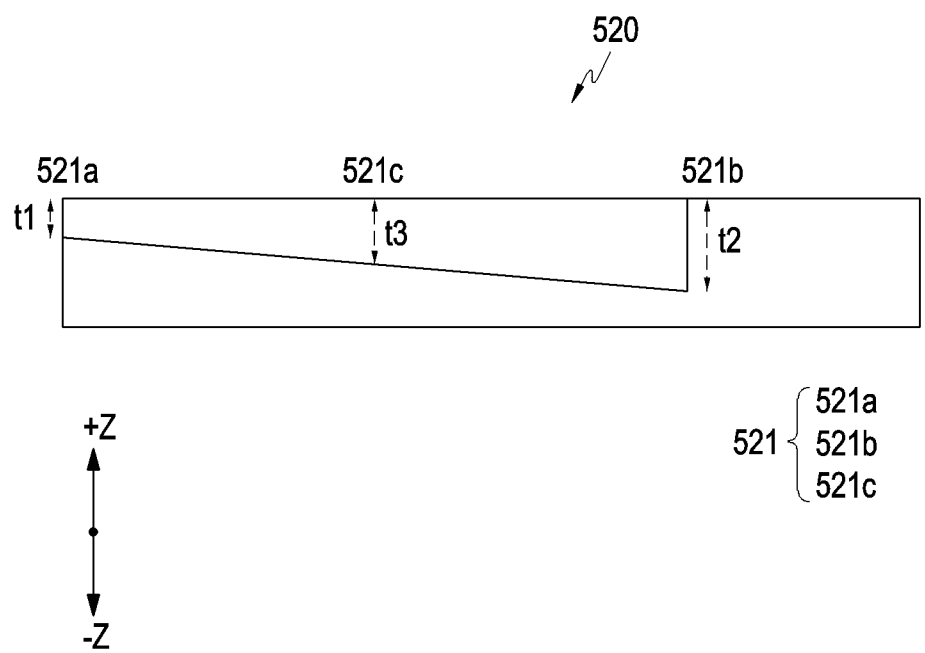
FIG. 12 is a view illustrating an unfolded inclined portion of a supporting member according to an embodiment of the disclosure.
Figure 13A:
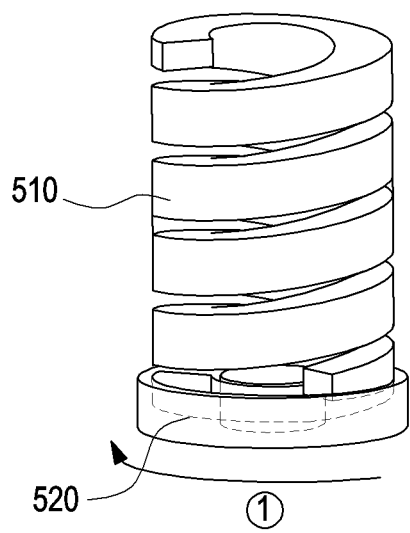
FIG. 13A is a view illustrating a state in which a spring and a supporting member are coupled in a first state, according to an embodiment of the disclosure.
Figure 13B:
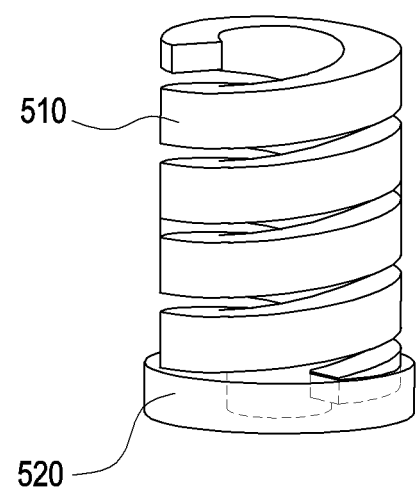
FIG. 13B is a view illustrating a state in which a spring and a supporting member are coupled in a second state, according to an embodiment of the disclosure.

FIGS. 8A and 8B are views illustrating a rear surface and a front surface of a hinge module 500 according to an embodiment of the disclosure. FIGS. 9A and 9B are perspective and front views illustrating a rear surface of a hinge module 500 including a free-stop assembly according to an embodiment of the disclosure. FIG. 10 is a view illustrating a portion of the hinge module 500 according to an embodiment of the disclosure. FIG. 11 is a view illustrating a spring 510 and a supporting member 520 according to an embodiment of the disclosure. FIG. 12 is a view illustrating an unfolded inclined portion 521 of a supporting member 520 according to an embodiment. FIG. 13A is a view illustrating a state in which a spring 510 and a supporting member 520 are coupled in a first state according to an embodiment of the disclosure. FIG. 13B is a view illustrating a state in which the spring 510 and the supporting member 520 are coupled in the second state according to an embodiment.

Referring to FIGS. 8A, 8B, 9A, 9B, 10 to 12, 13A, and 13B, the hinge module 500 may include a hinge housing 501 including an receiving space, a spring 510 positioned in the receiving space of the hinge housing 501, a supporting member 520 coupled to one end of the spring 510, and a cam 530 coupled to the other end of the spring 510. The configuration of the hinge housing 501, the spring 510, the supporting member 520, and the cam 530 of the hinge module 500 of FIGS. 8A, 8B, 9A, 9B, 10 to 12, 13A, and 13B may be the same in whole or part as the configuration of the hinge module 180, the hinge housing 140, the elastic member 420, and the third cam structure 410 of FIGS. 5, 6, and 7.

Figure 24:
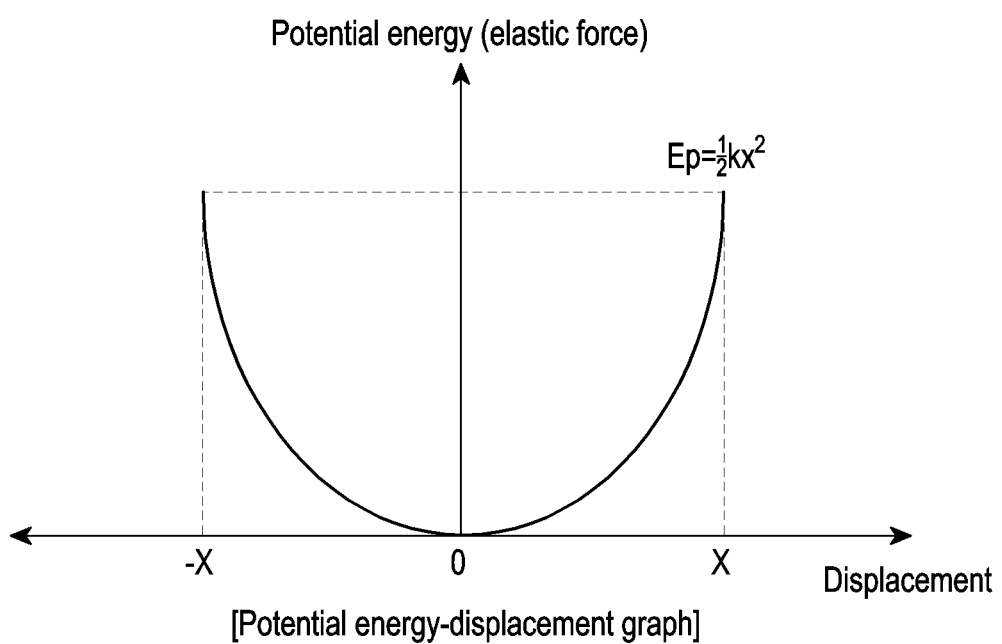
FIG. 24 is a graph illustrating potential energy (elastic force) and potential energy displacement graph according to an embodiment of the disclosure.

FIG. 24 is a graph illustrating potential energy (elastic force) and potential energy displacement graph according to an embodiment of the disclosure.

Referring to FIG. 24, according to an embodiment, the spring 510 may be positioned in the receiving space of the hinge housing 501. The elastic force of the spring 510 may be proportional to the displacement square of the spring 510.

According to an embodiment, the first cam structure (e.g., the first cam structure 311 of FIG. 7) corresponding to the cam 530 may rotate about the rotational axis according to the folding angle of the electronic device, and may move along the diagonal surface of the cam 530 while the first cam structure rotates. Accordingly, the spring 510 coupled to the cam 530 may be pressed while the cam 530 rotates along the rotational axis in response to the rotation of the first cam structure, and the elastic energy of the spring 510 may be adjusted.

According to an embodiment, a plurality of springs 510 may be mounted. For example, referring to FIGS. 8A and 8B, four springs 510 may be mounted. Two springs may be mounted on each of the first housing (e.g., 110 of FIG. 1) and the second housing (e.g., 120 of FIG. 1). For example, referring to FIGS. 9A and 9B, six springs 510 may be mounted. The hinge module 500 according to FIGS. 9A and 9B may further include a free-stop assembly 501a. Two springs may be mounted on each of the first housing (e.g., 110 of FIG. 1), the second housing (e.g., 120 of FIG. 1), and the free-stop assembly 501a.

According to an embodiment, the elastic energy of the spring 510 may vary depending on the degree of compression of the spring 510 according to the size of the receiving space in which the spring 510 is mounted. The elastic energy of the spring 510 may be adjusted by repositioning the supporting member 520 coupled to the spring 510 with respect to the spring 510. For example, it may be adjusted by changing the degree of coupling between the spring 510 and the supporting member 520. For example, it may be adjusted by changing the coupling thickness of the spring 510 and the supporting member 520. According to an embodiment, the spring 510 may have a predetermined inclination.

According to an embodiment, the supporting member 520 may be coupled to one end of the spring 510 to support the spring 510 in order to generate elastic energy by compressing the spring 510.

According to an embodiment, the supporting member 520 of the spring 510 may include an inclined portion 521 corresponding to one end of the spring 510. The inclined portion 521 of the supporting member 520 may correspond to one end of the spring 510 disposed diagonally at a predetermined inclination. The inclined portion 521 of the supporting member 520 may be formed in a spiral shape along the shape of the supporting member 520. The height of the inclined portion 521 of the supporting member 520 may vary depending on the position thereof. The height of the inclined portion 521 may be a portion recessed by a predetermined length in a direction opposite to the direction facing the spring 510 from the front surface in contact with the spring 510. The length recessed in the direction opposite to the direction facing the spring 510 may vary depending on the position with respect to the central axis.

According to an embodiment, referring to FIGS. 11 and 12, the recess length of the inclined portion 521 of the supporting member 520 may gradually increase. The inclined portion 521 of the supporting member 520 may include a first portion 521a formed to be inclined and recessed by a first length t1, a second portion 521b formed to be inclined at a position different from the first portion 521a and recessed by a second length t2, and a third portion 521c positioned between the first portion 521a and the second portion 521b and recessed by a third length t3 longer than the first length t1 and shorter than the second length t2. For example, the recessed length of the supporting member 520 may be greater than or equal to the first length t1 and less than or equal to the second length t2. For example, the first portion 521a may be recessed by the first length t1, and the length gradually recessed from the first portion 521a to the third portion 521c may be increased, so that the third portion 521c may be recessed by the third length t3. The length gradually recessed from the third portion 521c to the second portion 521b may be increased, and the second portion 521b may be recessed by the second length t2.

According to an embodiment, the position where one end of the spring 510 is seated on the inclined surface of the supporting member 520 may vary depending on the degree to which the supporting member 520 is rotated.

According to an embodiment, referring to FIGS. 13A and 13B, one end of the spring 510 disposed diagonally at a predetermined inclination may be configured to be coupled to the inclined portion 521 of the supporting member 520. A state in which one end of the spring 510 is coupled to the first portion 521a of the inclined portion 521 may be defined as a first state. A state in which one end of the spring 510 is coupled to the second portion 521b of the inclined portion 521 may be defined as a second state.

According to an embodiment, in the first state, one end of the spring 510 may overlap the inclined portion 521 by the first length t1. For example, in the first state, the coupling thickness between one end of the spring 510 and the inclined portion 521 may be substantially the first length t1. Since the first length t1 is the minimum length among the lengths recessed in the inclined portion 521, the elastic energy of the spring 510 may increase.

According to an embodiment, in the second state, one end of the spring 510 may overlap the inclined portion 521 by the second length t2. For example, in the second state, the coupling thickness between one end of the spring 510 and the inclined portion 521 may be substantially the second length t2. Since the second length t2 is the maximum length among the lengths recessed in the inclined portion 521, the elastic energy of the spring 510 may be reduced.

Figure 14:
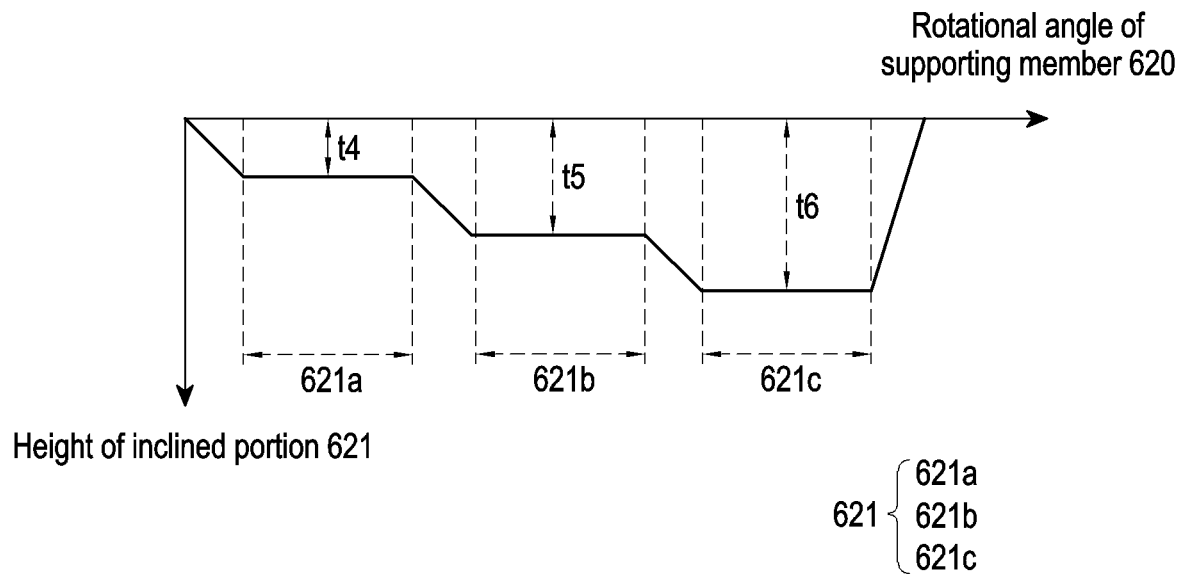
FIG. 14 is a graph illustrating a height of an inclined portion according to a rotational angle of a supporting member, according to an embodiment of the disclosure.
Figure 15:
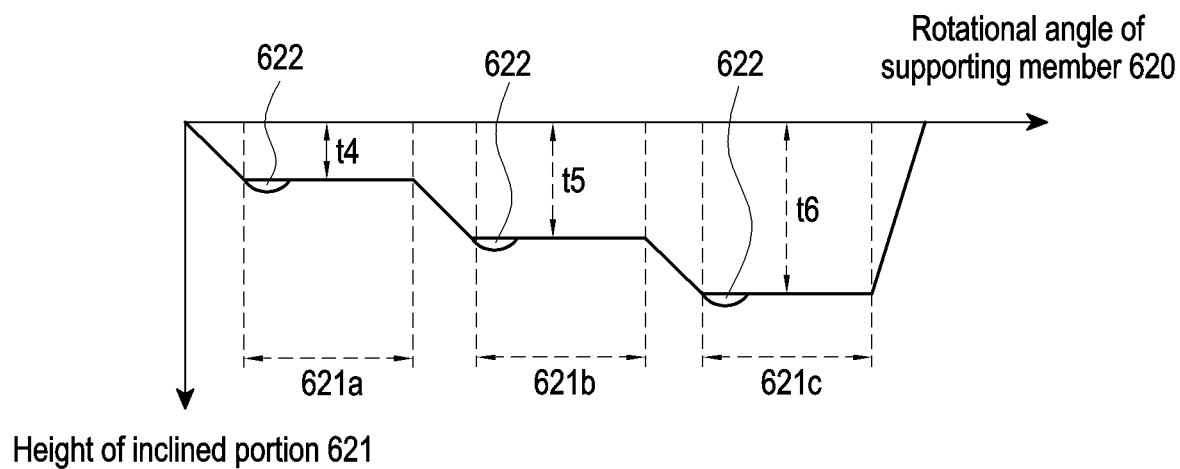
FIG. 15 is a graph illustrating a height of an inclined portion including an inner protrusion according to a rotational angle of a supporting member, according to an embodiment of the disclosure.
Figure 16:
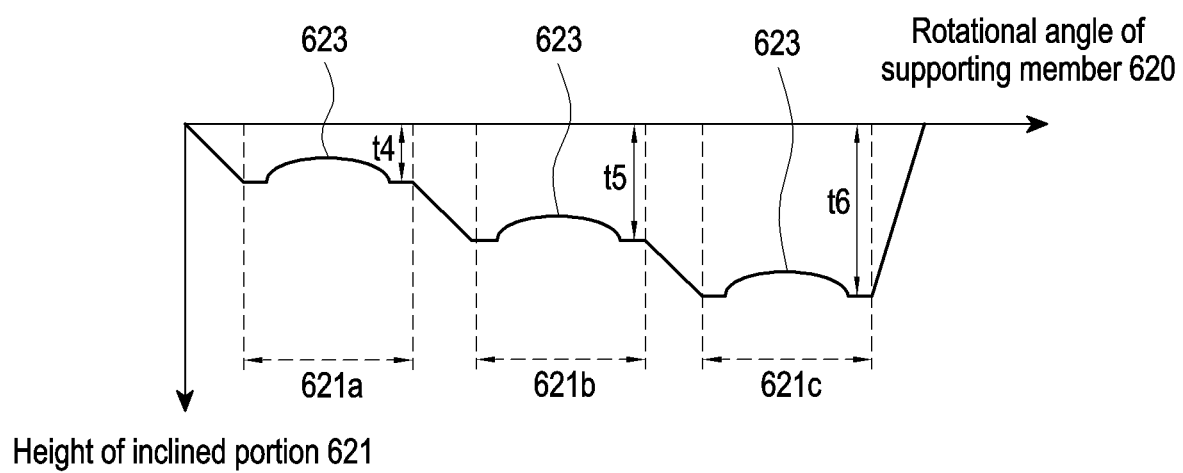
FIG. 16 is a graph illustrating a height of an inclined portion including a recess according to a rotational angle of a supporting member, according to an embodiment of the disclosure.

FIG. 14 is a graph illustrating a height of an inclined portion 621 according to a rotational angle of a supporting member 620 according to an embodiment of the disclosure. FIG. 15 is a graph illustrating a height of an inclined portion 621 including an inner protrusion 622 according to a rotational angle of a supporting member 620 according to an embodiment of the disclosure. FIG. 16 is a graph illustrating a height of an inclined portion 621 including an inner recess 623 according to a rotational angle of a supporting member 620 according to an embodiment.

Referring to FIGS. 14 to 16, the hinge module 500 may include a hinge housing 501 including an receiving space, a plurality of springs 510 positioned in the receiving space of the hinge housing 501, a supporting member 620 coupled to one end of the spring 510, and a cam 530 coupled to the other end of the spring 510. The configuration of the hinge module 500, the hinge housing 501, the spring 510, the supporting member 620, and the cam 530 of FIGS. 14 to 16 may be the same in whole or part as the configuration of the hinge housing 501, the spring 510, the supporting member 520, and the cam 530 of FIGS. 8A, 8B, 9A, 9B, 10 to 12, 13A, and 13B.

According to an embodiment, the supporting member 620 may be coupled to one end of the spring 510 to support the spring 510 in order to generate elastic energy by compressing the spring 510.

According to an embodiment, the supporting member 620 of the spring 510 may include an inclined portion 621 corresponding to one end of the spring 510. The inclined portion 621 of the supporting member 620 may correspond to one end of the spring 510 disposed diagonally at a predetermined inclination. The inclined portion 621 of the supporting member 620 may be formed in a circular shape along the shape of the supporting member 620. The height of the inclined portion 621 of the supporting member 620 may vary depending on the position thereof. The height of the inclined portion 621 may be a portion recessed by a predetermined length in a direction opposite to the direction facing the spring 510 from the front surface in contact with the spring 510. The length recessed in the direction opposite to the direction facing the spring 510 may vary depending on the position with respect to the central axis.

According to an embodiment, referring to FIG. 14, the inclined portion 621 of the supporting member 620 may include a flat portion. The inclined portion 621 of the supporting member 620 may gradually increase in height (recess length) and may form a plurality of steps. The inclined portion 621 of the supporting member 620 may include a first portion 621a having a height of a fourth length t4, a flat second portion 621b having a fifth length t5 longer than the fourth length t4, and a flat third portion 621c having a sixth length t6 longer than the fifth length t5. The first portion 621a, the second portion 621b, and the third portion 621c may be connected to each other by a slope having a predetermined inclination. For example, the height (recess length) of the supporting member 620 may be greater than or equal to the fourth length t4 and less than or equal to the sixth length t6. For example, the inclined portion 621 of the supporting member 620 may be recessed from the first portion 621a by the fourth length t4, and the length gradually recessed from the first portion 621a to the second portion 621b may be increased, and thus the inclined portion 621 of the supporting member 620 may be recessed from the second portion 621b by the fifth length t5. The length gradually recessed from the second portion 621b to the third portion 621c may be increased, and may be recessed from the third portion 621c by the sixth length t6. However, the number of steps is not limited, and the design may vary depending on the size and structure.

According to an embodiment, the position where one end of the spring 510 is seated on the inclined surface of the supporting member 620 may vary depending on the degree to which the supporting member 620 is rotated.

According to an embodiment, the spring 510 may be seated on the first portion 621a according to the angle at which the supporting member 620 is rotated. One end of the spring 510 may overlap the inclined portion 621 by the fourth length t4. For example, the coupling thickness between one end of the spring 510 and the inclined portion 621 may be substantially the fourth length t4. Since the recessed fourth length t4 of the first portion 621a is the minimum length among the recessed lengths of the inclined portion 621, the elastic energy of the spring 510 may increase.

According to an embodiment, the spring 510 may be seated on the third portion 621c according to the angle at which the supporting member 620 is rotated. One end of the spring 510 may overlap the inclined portion 621 by the sixth length t6. For example, the coupling thickness between one end of the spring 510 and the inclined portion 621 may be substantially the fourth length t4. Since the recessed sixth length t6 of the third portion 621c is the maximum length among the recessed lengths of the inclined portion 621, the elastic energy of the spring 510 may be relatively reduced. As described above, the elastic energy of the spring 510 may be adjusted by rotating the supporting member 620.

According to an embodiment, referring to FIG. 15, the supporting member 620 may further include the inner protrusion 622 for fixing the position of the spring 510. The inner protrusion 622 illustrated in FIG. 15 is a schematic shape, and may substantially protrude inward of the supporting member 620 on the XY plane. The inclined portion 621 of the supporting member 620 may include a first protrusion positioned on the front surface of the first portion 621a, a second protrusion positioned on the front surface of the second portion 621b, and a third protrusion positioned on the front surface of the third portion 621c. The inner protrusion 622 may contact one end of the spring 510 to fix the position of the spring 510.

According to an embodiment, referring to FIG. 16, the supporting member 620 may further include an inner recess 623 for fixing the position of the spring 510. The inner protrusion 622 illustrated in FIG. 16 is a schematic shape, and may substantially protrude outward from the supporting member 620 on the XY plane. The inclined portion 621 of the supporting member 620 may include a first recess 623 positioned in the first portion 621a, a second recess 623 positioned in the second portion 621b, and a third recess 623 positioned in the third portion 621c. One end of the spring 510 may be seated in the inner recess 623 to fix the position of one end of the spring 510.

Figure 17:
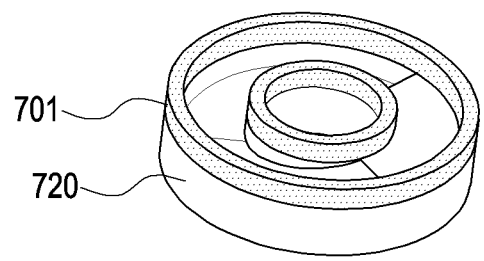
FIG. 17 is a view illustrating a supporting member and a guide according to an embodiment of the disclosure.
Figure 18:
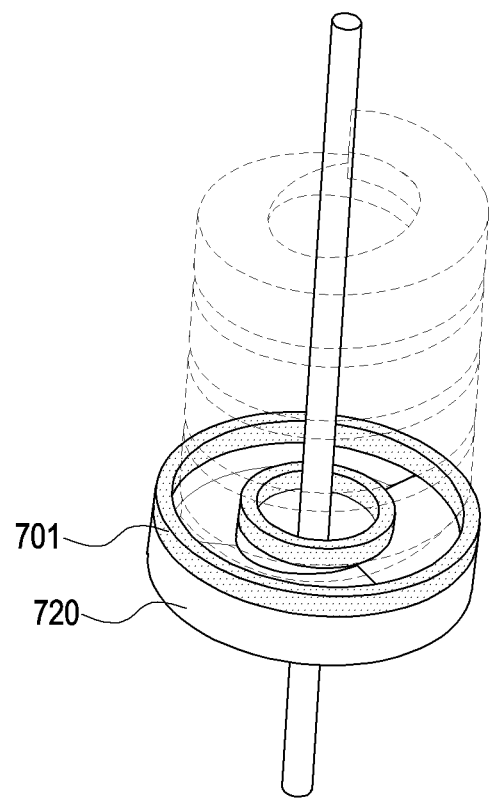
FIG. 18 is a view illustrating a supporting member and a guide coupled with a spring according to an embodiment of the disclosure.

FIG. 17 is a graph illustrating a supporting member 720 and a guide 701 according to an embodiment. FIG. 18 is a graph illustrating a supporting member 720 and a guide 701 coupled to a spring 510 according to an embodiment of the disclosure.

Referring to FIGS. 17 to 18, the hinge module 500 may include a hinge housing 501 including an receiving space, a plurality of springs 510 positioned in the receiving space of the hinge housing 501, a supporting member 720 coupled to one end of the spring 510, and a cam 530 coupled to the other end of the spring 510. The configuration of the hinge module 500, the hinge housing 501, the spring 510, the supporting member 720, and the cam 530 of FIGS. 17 and 18 may be the same in whole or part as the configuration of the hinge module 500, the hinge housing 501, the spring 510, the supporting member 620, and the cam 530 of FIGS. 14 to 16.

According to an embodiment, the electronic device may further include a guide 701 for preventing the spring 510 from being separated. The shape of the guide 701 may be a doughnut shape corresponding to the shape of the supporting member 720. The guide 701 may be coupled to the supporting member 720 to form a height larger than the height (e.g., in the Z-axis direction) of the supporting member 720 that the spring 510 may contact due to the rotation of the supporting member 720. According to an embodiment, referring to FIG. 18, the center of the guide 701 added to the supporting member 720 to guide the spring 510 may coincide with the center of the supporting member 720 and the center of the spring 510. The supporting member 720 coupled to the guide 701 may be in contact with a lower end of the spring 510. The lower end of the spring 510 may be coupled to the supporting member 720 through the guide 701.

Figure 19A:
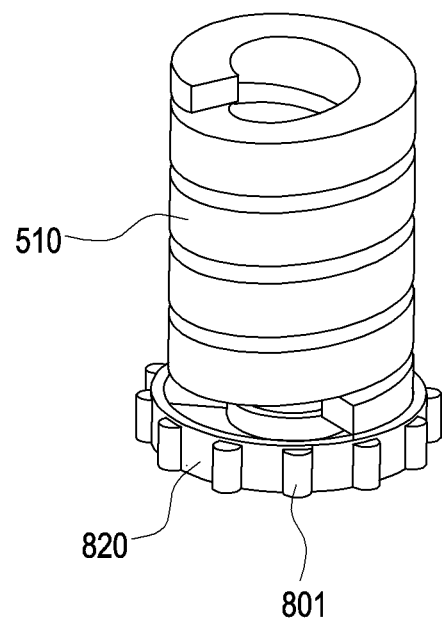
FIGS. 19A and 19B are views illustrating a supporting member including outer and inner protrusions coupled with springs, according to an embodiment of the disclosure.
Figure 19B:
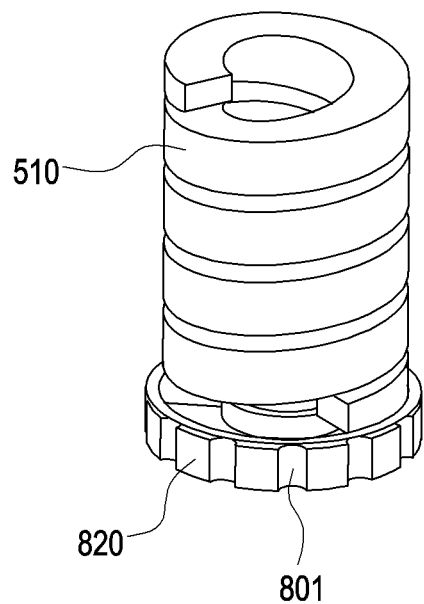
Figure 20A:
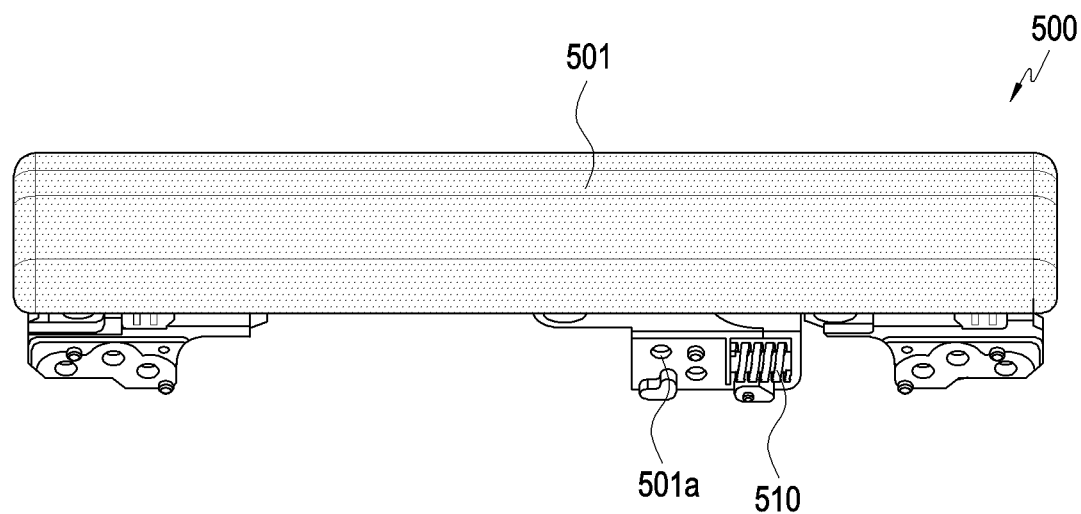
FIGS. 20A, 20B, and 20C are views illustrating a rear surface of a hinge housing and a hinge module when the hinge housing is removed, according to an embodiment of the disclosure.
Figure 20B:
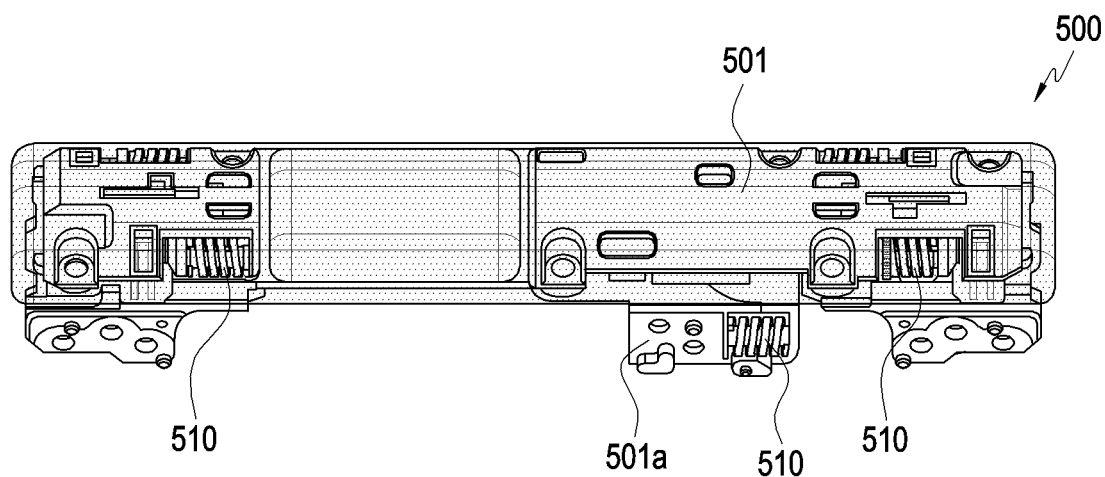
Figure 20C:
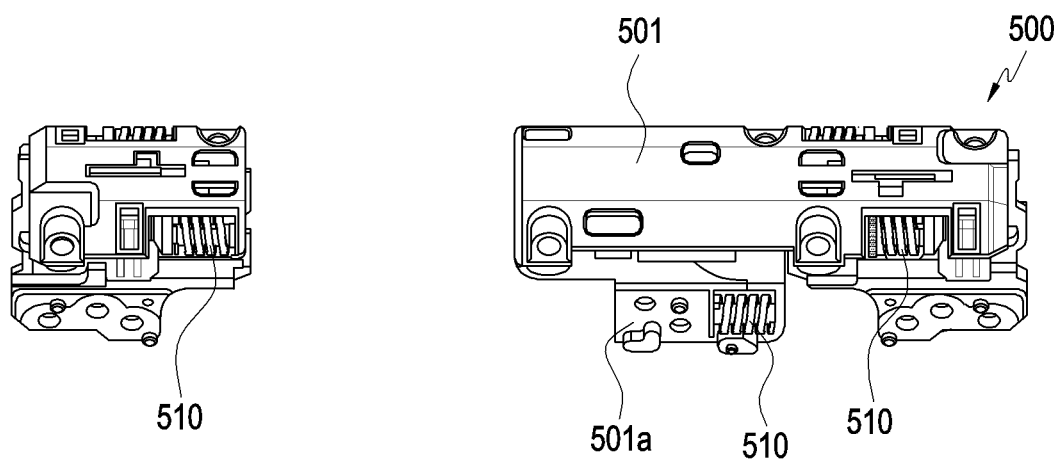
Figure 21:
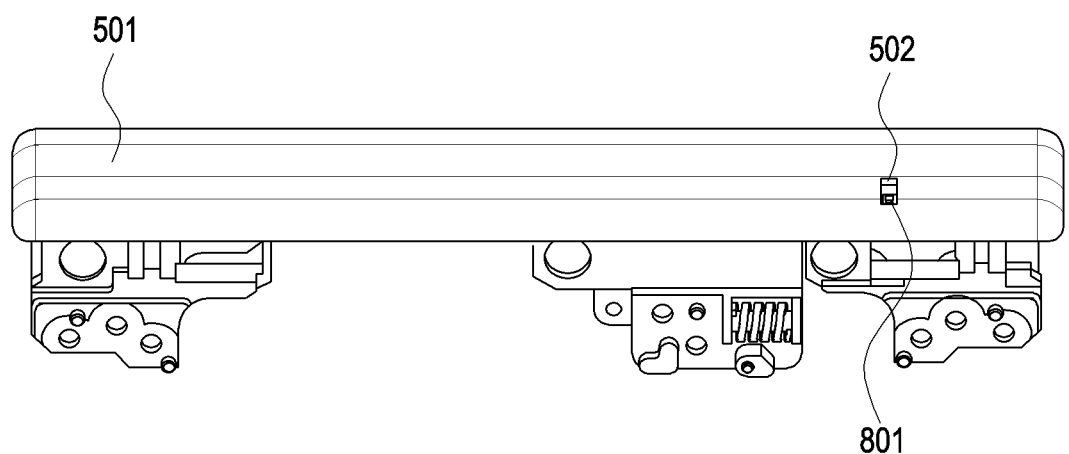
FIG. 21 is a view illustrating a rear surface and an outer protrusion of a hinge housing, according to an embodiment of the disclosure.
Figure 22:
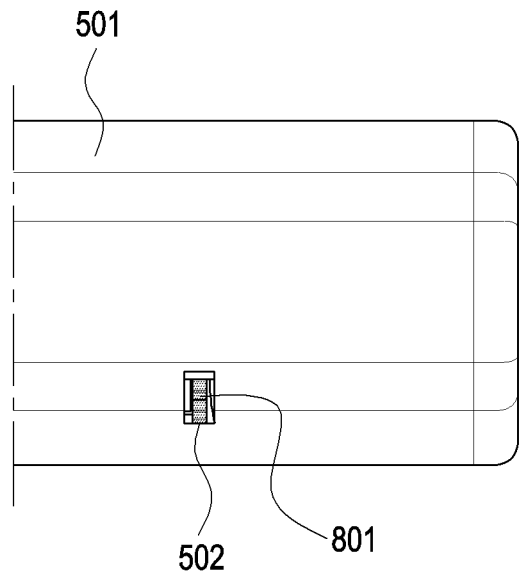
FIG. 22 is an enlarged view illustrating a rear surface and an outer protrusion of a hinge housing, according to an embodiment of the disclosure.
Figure 23:
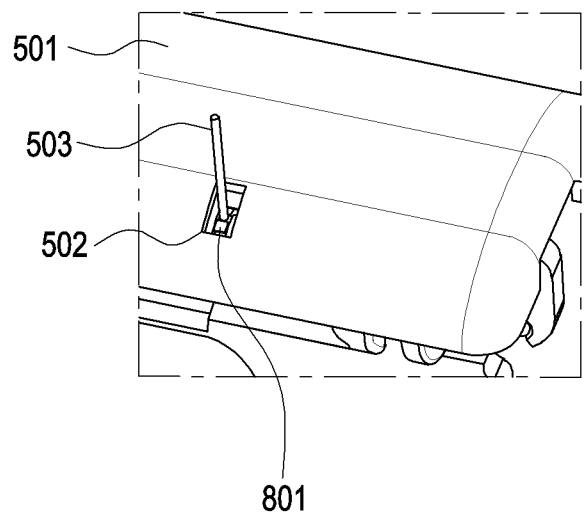
FIG. 23 is a side perspective view illustrating a rear surface and an outer protrusion of a hinge housing, according to an embodiment of the disclosure.

FIGS. 19A and 19B are views illustrating a supporting member 820 including outer and inner protrusions 801 coupled to a spring 510 according to an embodiment of the disclosure. FIGS. 20A, 20B, and 20C are views illustrating a rear surface of a hinge housing 501 and a hinge module 500 when the hinge housing 501 is removed, according to an embodiment of the disclosure. FIG. 21 is a view illustrating a rear surface and an outer protrusion 801 of a hinge housing 501 according to an embodiment of the disclosure. FIG. 22 is an enlarged view illustrating a rear surface and an outer protrusion 801 of a hinge housing 501 according to an embodiment of the disclosure. FIG. 23 is an enlarged side perspective view illustrating a rear surface and an outer protrusion 801 of a hinge housing 501 according to an embodiment of the disclosure.

Referring to FIGS. 19A, 19B, 20A, 20B, 20C, 21, 22, and 23, the hinge module 500 may include a hinge housing 501 including an receiving space, a plurality of springs 510 positioned in the receiving space of the hinge housing 501, a supporting member 820 coupled to one end of the spring 510, and a cam 530 coupled to the other end of the spring 510. The configuration of the hinge module 500, the hinge housing 501, the spring 510, the supporting member 820, and the cam 530 of FIGS. 19A, 19B, 20A, 20B, 20C, 21, 22, and 23 may be the same in whole or part as the configuration of the hinge module 500, the hinge housing 501, the spring 510, the supporting member 720, and the cam 530 of FIGS. 17 to 18.

According to one embodiment, referring to FIGS. 19A and 19B, the supporting member 820 may further include a plurality of outer and/or inner protrusions 801 for rotating the supporting member 820. The plurality of outer and/or inner protrusions 801 may be disposed to be spaced apart from each other at regular intervals along the outer surface of the supporting member 820.

According to an embodiment, referring to FIGS. 20A to 20C, the user may directly manipulate the outer protrusion 801 of the supporting member 820 by removing the hinge housing 501. According to an embodiment, referring to FIGS. 21 to 23, the hinge housing 501 may include a hole 502 formed at a position corresponding to the supporting member 820 and a cover (not shown) capable of blocking the hole 502. The hole 502 may be large enough to allow the outer protrusion 801 of the supporting member 820 to be identified from the outside. The cover (not shown) may have a size corresponding to the hole 502. The cover (not shown) may include, e.g., a rubber material. When it is necessary to adjust the tension of the hinge, the user may remove the cover (not shown) and rotate the outer protrusion 801 seen through the hole 502. The hinge module may further include a stick 503. When the user needs to adjust the tension of the hinge, the user may remove the cover (not shown) and rotate the outer protrusion 801 seen through the hole 502 through the stick 503. The stick 503 may use, e.g., a SIM ejector coupled to the electronic device to insert a SIM card.

An electronic device (e.g., a portable terminal) includes a display with a flat surface or both a flat and curved surface. An electronic device including a display may be limited in implementing a screen larger than the size of the electronic device due to the structure of the fixed display. Therefore, foldable electronic devices are being studied.

In implementing a foldable electronic device, it may be difficult to secure mechanical stability while enabling structures of the electronic device to move (e.g., rotate) relative to each other. In the foldable electronic device, the display may be shaken with only a small force while the electronic device is unfolded. This may be because the elasticity of the spring mounted on the hinge module is weakened, or the cam structure for transferring force to the spring is deformed or worn.

According to an embodiment of the disclosure, there may be provided an electronic device including a supporting member that adjusts elastic energy generated by a spring mounted on a hinge module, thereby making adjustment to reduce an unwanted movement in the hinge module by increasing the elastic energy of the spring.

According to an embodiment of the disclosure, a folding tension desired by the user may be selectively provided by including a supporting member that adjusts elastic energy generated by a plurality of springs mounted on the hinge module to match the elastic energy generated by the plurality of springs.

The disclosure is not limited to the foregoing embodiments but various modifications or changes may rather be made thereto without departing from the spirit and scope of the disclosure.

According to an embodiment of the disclosure, an electronic device may comprise a housing (102 of FIG. 1) including a first housing (110 of FIG. 1) and a second housing (120 of FIG. 1) configured to rotate relative to the first housing and a hinge module (500 of FIG. 10) rotatably coupling the first housing and the second housing and received in the housing. The hinge module may include a hinge housing (501 of FIG. 10) including a receiving space, a spring (510 of FIG. 10) positioned in the receiving space of the hinge housing, a supporting member (520 of FIG. 10) including an inclined portion coupled to one end of the spring, and a cam (530 of FIG. 10) coupled to another end of the spring and configured to transfer force to the spring.

According to an embodiment, the supporting member is coupled to the one end of the spring such that a position where the one end of the spring is seated on the inclined portion of the supporting member may be varied depending on a degree of rotation of the supporting member.

According to an embodiment, the inclined portion of the supporting member may be disposed to correspond to the one end of the spring, wherein the one end of the spring has an inclined shape corresponding to the shape of the inclined portion.

According to an embodiment, the one end of the spring may be seated on at least a portion of the inclined portion of the supporting member.

According to an embodiment, the supporting member may include a first portion (521a of FIG. 11) having an inclination and recessed by a first length (t1 of FIG. 11), a second portion (521b of FIG. 11) having an inclination at a position different from the first portion and recessed by a second length (t2 of FIG. 11), and a third portion (521c of FIG. 11) being a portion between the first portion and the second portion and recessed by a third length (t3 of FIG. 11) longer than the first length and shorter than the second length.

According to an embodiment, a recessed length of the supporting member may be equal to or greater than the first length, and equal to or less than the second length. According to an embodiment, the spring may be disposed to be compressed more when the one end of the spring is seated on the first portion of the supporting member than when the one end of the spring is seated on the second portion of the supporting member.

According to another embodiment, an elastic energy applied to the spring may be larger when the one end of the spring is seated on the first portion of the supporting member than when the one end of the spring is seated on the second portion of the supporting member.

According to an embodiment, each of the first portion, the second portion, and the third portion may include an inner protrusion (622 of FIG. 15) protruding inward of the supporting member.

According to an embodiment, each of the first portion, the second portion, and the third portion may include an inner recess (623 of FIG. 16) recessed outward of the supporting member.

According to an embodiment, the supporting member may include a flat first portion (621*a* of FIG. 14) recessed by a first length (t4 of FIG. 14), a flat second portion (621*b* of FIG. 14) extending from the first portion and recessed by a second length (t5 of FIG. 14) longer than the first length, and a flat third portion (621*c* of FIG. 14) extending from the second portion and recessed by a third length (t6 of FIG. 14) longer than the second length.

According to an embodiment, each of the first portion, the second portion, and the third portion may include an inner protrusion (622 of FIG. 15) protruding inward of the supporting member.

According to an embodiment, each of the first portion, the second portion, and the third portion may include an inner recess (623 of FIG. 16) recessed outward of the supporting member.

According to an embodiment, a guide (701 of FIG. 17) extending in a thickness direction from the supporting member (720 of FIG. 17).

According to an embodiment, the supporting member (820 of FIG. 19A) may further include a plurality of outer protrusions (801 of FIG. 19A) protruding outward and spaced apart from each other at regular intervals.

According to an embodiment of the disclosure, an electronic device may comprise a housing including a first housing and a second housing configured to rotate relative to the first housing and a hinge module rotatably coupling the first housing and the second housing and received in the housing. The hinge module may include a hinge housing including a receiving space, a spring positioned in the receiving space of the hinge housing, a supporting member including an inclined portion, and a cam coupled to another end of the spring and transferring force to the spring. The supporting member may include a flat first portion (621*a* of FIG. 14) recessed by a first length (t4 of FIG. 14), a flat second portion (621*b* of FIG. 14) extending from the first portion and recessed by a second length (t5 of FIG. 14) longer than the first length, and a flat third portion (621*c* of FIG. 14) extending from the second portion and recessed by a third length (t6 of FIG. 14) longer than the second length. The supporting member is coupled to one end of the spring such that a position where the one end of the spring is seated on the inclined portion of the supporting member may be varied depending on a degree of rotation of the supporting member.

According to an embodiment, the inclined portion of the supporting member may be disposed to correspond to the one end of the spring wherein the one end of the spring has an inclined shape corresponding to the shape of the inclined portion.

According to an embodiment, the one end of the spring may be seated on at least a portion of the inclined portion of the supporting member.

According to an embodiment, a recessed length of the supporting member may be equal to or greater than the first length, and equal to or less than the second length.

According to an embodiment, the spring may be disposed to be compressed more when the one end of the spring is seated on the first portion of the supporting member than when the one end of the spring is seated on the second portion of the supporting member.

What is claimed is:

1. An electronic device comprising:
   a housing including a first housing and a second housing configured to rotate relative to the first housing; and
   a hinge module rotatably coupling the first housing and the second housing and received in the housing,
   wherein the hinge module includes:
      a hinge housing including a receiving space,
      a spring positioned in the receiving space of the hinge housing,
      a supporting member including an inclined portion coupled to one end of the spring, and
      a cam coupled to another end of the spring and configured to transfer force to the spring, and
      wherein the supporting member is coupled to the one end of the spring such that a position where the one end of the spring is seated on the inclined portion of the supporting member is varied depending on a degree of rotation of the supporting member.

2. The electronic device of claim 1,
   wherein the inclined portion of the supporting member is disposed to correspond to the one end of the spring, and
   wherein the one end of the spring has an inclined shape corresponding to a shape of the inclined portion.

3. The electronic device of claim 1, wherein the one end of the spring is seated on at least a portion of the inclined portion of the supporting member.

4. The electronic device of claim 1, wherein the supporting member includes:
   a first portion having an inclination and recessed by a first length;
   a second portion having an inclination at a position different from the first portion and recessed by a second length; and
   a third portion being a portion between the first portion and the second portion and recessed by a third length longer than the first length and shorter than the second length.

5. The electronic device of claim 4, wherein a recessed length of the supporting member is equal to or greater than the first length, and equal to or less than the second length.

6. The electronic device of claim 5, wherein the spring is disposed to be compressed more when the one end of the spring is seated on the first portion of the supporting member than when the one end of the spring is seated on the second portion of the supporting member.

7. The electronic device of claim 6, wherein an elastic energy applied to the spring is larger when the one end of the spring is seated on the first portion of the supporting member than when the one end of the spring is seated on the second portion of the supporting member.

8. The electronic device of claim 7, wherein each of the first portion, the second portion, and the third portion includes an inner protrusion protruding inward of the supporting member.

9. The electronic device of claim 8, wherein each of the first portion, the second portion, and the third portion includes an inner recess recessed outward of the supporting member.

10. The electronic device of claim 1, wherein the supporting member includes:
a flat first portion recessed by a first length;
a flat second portion extending from the first portion and recessed by a second length longer than the first length; and
a flat third portion extending from the second portion and recessed by a third length longer than the second length.

11. The electronic device of claim 10, wherein each of the first portion, the second portion, and the third portion includes an inner protrusion protruding inward of the supporting member.

12. The electronic device of claim 11, wherein each of the first portion, the second portion, and the third portion includes an inner recess recessed outward of the supporting member.

13. The electronic device of claim 12, further comprising a guide extending in a thickness direction from the supporting member.

14. The electronic device of claim 13, wherein the supporting member further includes a plurality of outer protrusions protruding outward and spaced apart from each other at regular intervals.

15. An electronic device comprising:
a housing including a first housing and a second housing configured to rotate relative to the first housing; and
a hinge module rotatably coupling the first housing and the second housing and received in the housing,
wherein the hinge module includes:
a hinge housing including a receiving space,
a spring positioned in the receiving space of the hinge housing,
a supporting member including an inclined portion coupled to one end of the spring, and
a cam coupled to another end of the spring and transferring force to the spring,
wherein the supporting member includes:
a flat first portion recessed by a first length,
a flat second portion extending from a first portion and recessed by a second length longer than the first length, and
a flat third portion extending from a second portion and recessed by a third length longer than the second length, and
wherein the supporting member is coupled to one end of the spring such that a position where the one end of the spring is seated on the inclined portion of the supporting member is varied depending on a degree of rotation of the supporting member.

16. The electronic device of claim 15,
wherein the inclined portion of the supporting member is disposed to correspond to the one end of the spring, and
wherein the one end of the spring has an inclined shape corresponding to a shape of the inclined portion.

17. The electronic device of claim 16, wherein the one end of the spring is seated on at least a portion of the inclined portion of the supporting member.

18. The electronic device of claim 17, wherein a recessed length of the supporting member is equal to or greater than the first length, and equal to or less than the second length.

19. The electronic device of claim 18, wherein the spring is disposed to be compressed more when the one end of the spring is seated on the first portion of the supporting member than when the one end of the spring is seated on the second portion of the supporting member.

* * * * *